(12) United States Patent
Saito et al.

(10) Patent No.: US 10,617,101 B2
(45) Date of Patent: Apr. 14, 2020

(54) FISHING REEL

(71) Applicant: Shimano Inc., Sakai, Osaka (JP)

(72) Inventors: Kei Saito, Osaka (JP); Takuji Takamatsu, Osaka (JP); Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/113,535

(22) Filed: Aug. 27, 2018

(65) Prior Publication Data

US 2019/0098884 A1 Apr. 4, 2019

(30) Foreign Application Priority Data

Sep. 29, 2017 (JP) .................................. 2017-191604

(51) Int. Cl.
 *A01K 89/01* (2006.01)
 *A01K 89/015* (2006.01)
(52) U.S. Cl.
 CPC ................................. *A01K 89/0193* (2015.05)
(58) Field of Classification Search
 CPC ........ A01K 89/0193; A01K 89/011223; A01K 89/01126; A01K 89/006; A01K 89/004
 See application file for complete search history.

(56) References Cited

U.S. PATENT DOCUMENTS 5,160,099 A * 11/1992 Furomoto .......... A01K 89/0193
  242/321
5,379,959 A * 1/1995 Sato ..................... A01K 89/054
  242/299
5,927,630 A * 7/1999 Katayama .......... A01K 89/0117
  242/248
2017/0332614 A1* 11/2017 Saito ................ A01K 89/01902

FOREIGN PATENT DOCUMENTS

EP 3 245 868 A1 11/2017
JP 6-23455 U 3/1994

OTHER PUBLICATIONS

GB Search Report of corresponding GB Application No. 1815850.1 dated Mar. 20, 2019.
Search Report of corresponding GB Application No. 1815850.1 dated Mar. 20, 2019.

* cited by examiner

*Primary Examiner* — Emmanuel M Marcelo
(74) *Attorney, Agent, or Firm* — Global IP Counselors, LLP

(57) ABSTRACT

A fishing reel includes a drive shaft connected to a handle and supported by the reel body so as to be rotatable about a first axis, a drive gear on the drive shaft, a pinion gear rotating about a second axis with the rotation of the drive shaft and meshing with the drive gear, and a shaft bearing supporting the drive shaft so as to be rotatable about the first axis. The shaft bearing includes an inner race with an inner bearing surface contacting the drive shaft and an outer race having an outer bearing surface contacting the reel body. The inner bearing surface or the outer bearing surface includes an adjustment portion that causes the drive shaft to move in the first axial direction relative to the reel body, when the shaft bearing is moved relative to the drive shaft and the reel body.

12 Claims, 12 Drawing Sheets

FISHING REEL

CROSS-REFERENCE TO RELATED APPLICATIONS

This application claims priority to Japanese Patent Application No. 2017-191604, filed on Sep. 29, 2017. The entire disclosure of Japanese Patent Application No. 2017-191604 is hereby incorporated herein by reference.

BACKGROUND

Field of the Invention

The present invention relates to a fishing reel.

Background Art

Spinning reels, for example, are known as one type of fishing reel. In general, a spinning reel mainly comprises a reel body, which has a handle, a rotor disposed on the front side of the reel body and combined with the reel body so as to rotate, and a spool, around which a fishing line is wound, which is disposed on the front side of the rotor.

The handle is connected to a drive shaft that extends in the left-right direction of the reel body. The rotor has a pinion gear, which meshes with a drive gear formed on the drive shaft, and is configured to rotate about an axis that extends along the longitudinal direction of the reel body with the rotation of the drive shaft. The spool is configured to move back and forth in a reciprocating fashion with the rotation of the drive gear.

With this type of spinning reel, for such reasons as the smooth transmission of the rotational force from the drive gear to the pinion gear or the suppression of the generation of noise, vibration, and the like, it is necessary to adjust the meshing between the drive gear and the pinion gear.

A method is known, for example, in which meshing adjustment involves adjusting the relative positional relationship of the drive gear with respect to the pinion gear by attaching an adjustment member, such as a washer, between the reel body and a portion of the drive shaft that is positioned on the opposite side of the pinion gear with the drive gear interposed therebetween, and adjusting the number, type, etc., of the adjustment member.

Furthermore, as disclosed in Japanese Unexamined Utility Model Application Publication No. Hei 6 [1994]-23455, a spinning reel is known in which it is possible to adjust the positional relationship of the drive gear with respect to the pinion gear by adjusting the positions of a pair of movable members by an operation outside of the reel body.

One of the movable members is disposed on an inner side of an opening for inserting the handle, which is formed on the reel body, and is also disposed on the outer side of one shaft bearing that rotatably supports the drive shaft. The other movable member is disposed on an inner side of an opening for inserting the handle, which is formed on a reel cover portion and is also disposed on the outer side of the other shaft bearing that rotatably supports the drive shaft.

The pair of movable members are screwed into the inner circumferential surfaces of the openings and are in contact with the outer race of the respective shaft bearing from the outer side in the left-right direction. In each shaft bearing, the inner race is in contact with a flange portion of the drive shaft from the outer side in the left-right direction.

In a spinning reel configured in this manner, the movable members can be moved in the axial direction of the drive shaft (left-right direction) by rotating the pair of movable members (tightening operation or loosening operation); therefore, it is possible to move the drive shaft in the axial direction via the shaft bearings. As a result, it is possible to adjust the positional relationship of the drive gear with respect to the pinion gear and thus to adjust the meshing of the drive gear with respect to the pinion gear.

For example, if the engagement between the pinion gear and the drive gear is shallow, one of the movable members on the reel body side is loosened while the other movable member on the reel cover portion side is correspondingly tightened by the loosening operation. As a result, it is possible to separate one of the shaft bearings on the reel body side from the pinion gear side while bringing the other shaft bearing on the reel cover portion side close to the pinion gear side and to move the drive shaft in the axial direction, so that the drive gear approaches the pinion gear. As a result, it is possible to deepen the engagement between the pinion gear and the drive gear and to adjust the meshing of the drive gear with respect to the drive gear.

Specifically, unlike the above-described case in which a washer or the like is used, it is possible to adjust the meshing without disassembling the reel body.

However, in the above-described conventional spinning reel, because it is necessary to move the shaft bearings in the axial direction of the drive shaft with respect to the reel body and the reel cover portion as the pair of movable members are rotated, the positions of the shaft bearings change with respect to the reel body and the reel cover portion. Consequently, the degree to which load is applied between the outer races of the shaft bearings and the inner circumferential surfaces of the openings formed on the reel body and the reel cover portion changes, which could easily affect the rotational accuracy of the shaft bearings. Consequently, the rotational performance of the drive shaft may deteriorate, which leaves room for improvement.

Furthermore, in order to move the drive shaft in both axial directions, it is necessary to provide a shaft bearing on each of the reel body side and the reel cover portion side. Consequently, if the rotational accuracy of each of the shaft bearings is thereby affected, the rotational performance of the drive shaft will be significantly reduced.

SUMMARY

The present invention was conceived in light of these circumstances, and an object thereof is to provide a fishing reel that can easily and reliably adjust the meshing between the drive gear and the pinion gear without degrading the rotation performance of the drive shaft.

A fishing reel according to the present invention comprises a reel body that has a handle, a drive shaft that is connected to the handle and that is rotatably supported by the reel body to rotate about a first axis, a drive gear that is formed on the drive shaft, a pinion gear that rotates about a second axis, which intersects the first axis, as the drive shaft rotates, and a shaft bearing that is disposed between the drive shaft and the reel body and that rotatably supports the drive shaft to rotate about the first axis; the shaft bearing comprises an inner race having an inner bearing surface that comes into contact with the drive shaft on at least a portion of the inner circumferential surface, and an outer race having an outer bearing surface that comes into contact with the reel body on at least a portion of the outer circumferential surface, and at least one of the inner bearing surface and the outer bearing surface includes an adjustment portion that causes the drive shaft to move in the first axial direction relative to the reel body, when the shaft bearing is moved relative to the drive shaft and the reel body.

According to the fishing reel of the present invention, by moving the shaft bearing relative to the drive shaft and the reel body bearing (for example, by a rotation operation or a sliding operation), it is possible to move the drive shaft in the first axial direction (axial direction of the drive shaft) by utilizing the adjustment portion. It is thereby possible to cause the drive gear to approach and move away from the pinion gear in the first axial direction, and to easily and reliably adjust the meshing between the drive gear and the pinion gear.

In particular, at least a portion of the inner circumferential surface of the inner race is defined as the inner bearing surface and is in surface contact with the drive shaft, and at least a portion of the outer circumferential surface of the outer race is defined as the outer bearing surface and is in surface contact with the reel body. Accordingly, it is a simple matter to control the dimension of the shaft bearing in the radial direction with respect to the drive shaft and the reel body, and to dispose the shaft bearing between the drive shaft and the reel body with high dimensional accuracy. As a result, it is possible to provide a shaft bearing with excellent rotational accuracy, and to rotatably support the drive shaft stably without degradation of the rotational performance. As a result, it is possible to provide a high-quality, high-performance fishing reel that is capable of providing smooth rotation of the handle with little resistance and smooth winding of the fishing line.

The adjustment portion can be formed side by side with at least one of the inner bearing surfaces and the outer bearing surface in the first axial direction.

In this case, since the adjustment portion and the inner bearing surface or the outer bearing surface are formed side by side in the first axial direction, when the meshing between the drive gear and the pinion gear is adjusted, it is possible to suppress axial displacement of the drive shaft, and to adjust meshing without being affected by axial displacement.

At least one of the drive shaft and the reel body may include an adjustment target portion that moves the drive shaft relative to the reel body in the first axial direction in cooperation with the adjustment portion.

In this embodiment, it is possible to join, in mutual cooperation, the adjustment portion of the shaft bearing with the adjustment target portion that is disposed on at least one of the drive shaft and the reel body by, for example, screw engagement, concavo-convex engagement, or the like, and to smoothly move the drive shaft in the first axial direction. Therefore, it is possible to easily and stably adjust the meshing between the drive gear and the pinion gear.

The adjustment portion may comprise a first threaded portion and a second threaded portion screwed onto the first threaded portion, and the adjustment portion can move the drive shaft relative to the reel body in the first axial direction when the shaft bearing is rotated about the first axis with respect to the drive shaft and the reel body.

In this embodiment, because the first threaded portion and the second threaded portion are screwed and coupled together, it is possible to move the drive shaft relative to the reel body in the first axial direction and to adjust the meshing between the drive gear and the pinion gear by rotating the shaft bearing about the first axis. In particular, because the first threaded portion and the second threaded portion are screwed and coupled together, it is a simple matter to stably move the drive shaft in the first axial direction by a minute movement amount in accordance with a rotation operation of the shaft bearing, and it is a simple matter to finely and accurately adjust the meshing between the drive gear and the pinion gear.

The inner race can comprise a first inner race portion that holds a rolling element between the outer race and the first inner race portion, and a second inner race portion that includes the adjustment portion.

In this embodiment, it is possible to rotatably support the drive shaft around the first axis by utilizing the first inner race portion together with the rolling element and the outer race, and to adjust the meshing between the drive gear and the pinion gear by utilizing the second inner race portion. In this manner, because the inner race comprises a first inner race portion and a second inner race portion, it is a simple matter to cause the inner race to reliably rotatably support the drive shaft around the first axis, and adjust the meshing between the drive gear and the pinion gear.

The first inner race portion may include the inner bearing surface.

In this embodiment, because the first inner side portion that holds a rolling element between the outer race and the first inner race portion itself has an inner bearing surface, it is possible to rotatably support the drive shaft more stably and accurately.

The second inner race portion may include the inner bearing surface.

In this embodiment, because the second inner race portion comprises an inner bearing surface, it is possible, for example, to dispose the adjustment portion and the inner bearing surface side by side in the first axial direction, and to effectively suppress axial displacement of the drive shaft when meshing between the drive gear and the pinion gear is adjusted.

The shaft bearing can be configured to include an inner race biasing member that presses either the first inner race portion or the second inner race portion against the other inner race portion.

In this embodiment, because an inner race biasing member is provided, for example, even if the first inner race portion and the second inner race portion were disposed side by side in the first axial direction, it is possible to prevent the independent operation of the first inner race portion and the second inner race portion.

The outer race can comprise a first outer race portion that holds rolling elements between the inner race and the first outer race portion, and a second outer race portion that includes the adjustment portion.

In this embodiment, it is possible to rotatably support the drive shaft around the first axis by utilizing the first outer race portion together with the rolling element and the inner race, and to adjust meshing between the drive gear and the pinion gear by utilizing the second outer race portion. In this manner, because the outer race comprises a first outer race portion and a second outer race portion, it is a simple matter to cause the outer race to reliably rotatably support the drive shaft around the first axis, and adjust the meshing between the drive gear and the pinion gear.

The first outer race portion can include the outer bearing surface.

In this embodiment, because the first outer side portion that holds a rolling element between the inner race and the first outer race portion itself has an outer bearing surface, it is possible to rotatably support the drive shaft more stably and accurately.

The second outer race portion can include the outer bearing surface.

In this embodiment, because the second outer race portion includes the outer bearing surface, it is possible, for example, to dispose the adjustment portion and the outer bearing surface side by side in the first axial direction, and to effectively suppress an axial displacement of the drive shaft when the meshing between the drive gear and the pinion gear is adjusted.

The shaft bearing may include an outer race biasing member that presses either the first outer race portion or the second outer race portion against the other outer race portion.

In this embodiment, because an outer race biasing member is provided, for example, even if the first outer race portion and the second outer race portion were disposed side by side in the first axial direction, it would be possible to prevent the independent operation of the first outer race portion and the second outer race portion.

According to the fishing reel of the present invention, it is possible to easily and reliably adjust the meshing between the drive gear and the pinion gear without degradation of the rotational performance of the drive shaft.

DETAILED DESCRIPTION OF THE EMBODIMENTS

First Embodiment

A first embodiment of the fishing reel according to the present invention will be described below with reference to the drawings. In the present embodiment, a spinning reel is described as an example of a fishing reel. Additionally, in each of the drawings, there are cases in which the scale of each component member has been appropriately changed as required to improve the visibility of the component member.

Figure 1:
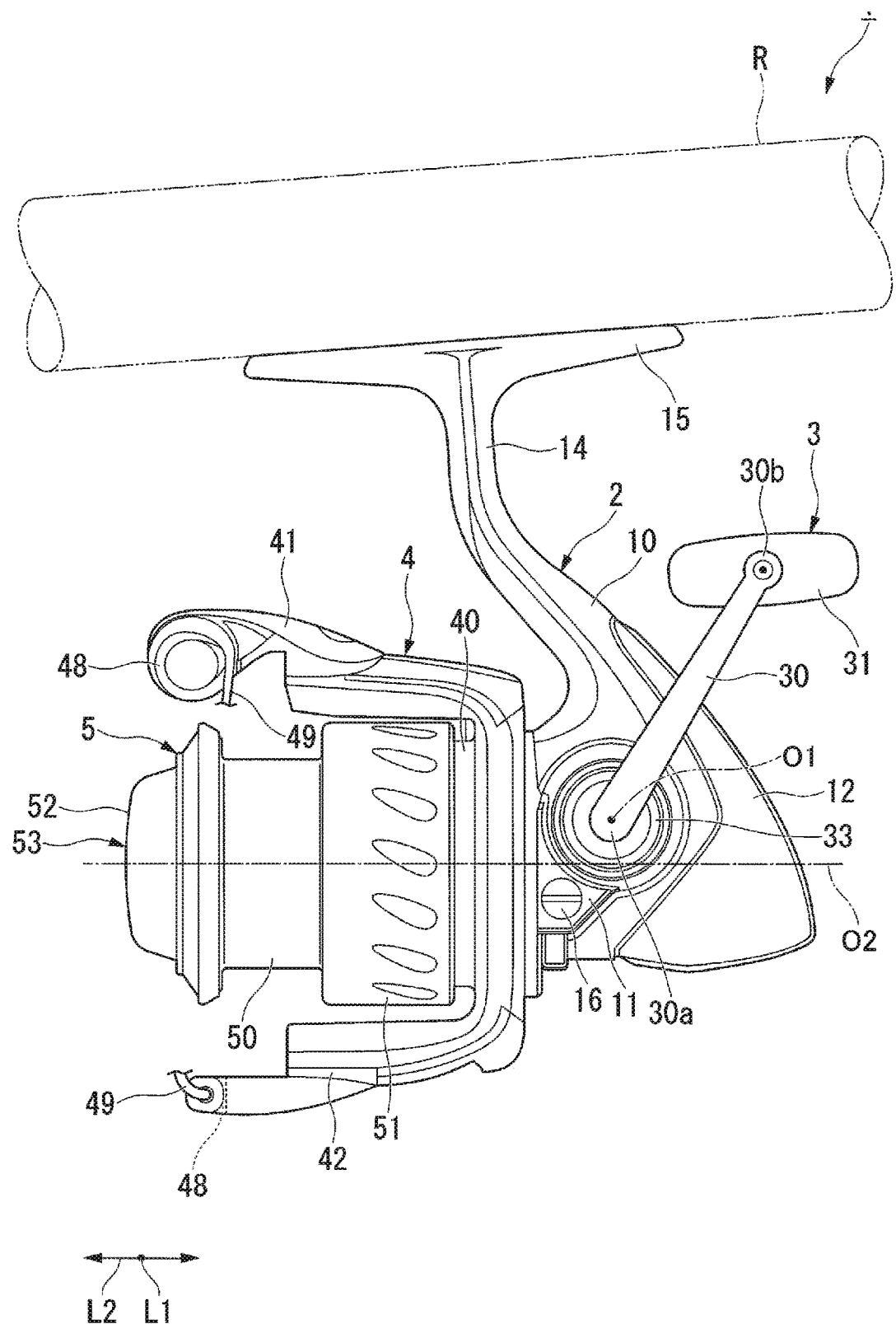
FIG. 1 is a side view of a spinning reel (fishing reel) in a first embodiment of the present invention.
Figure 2:
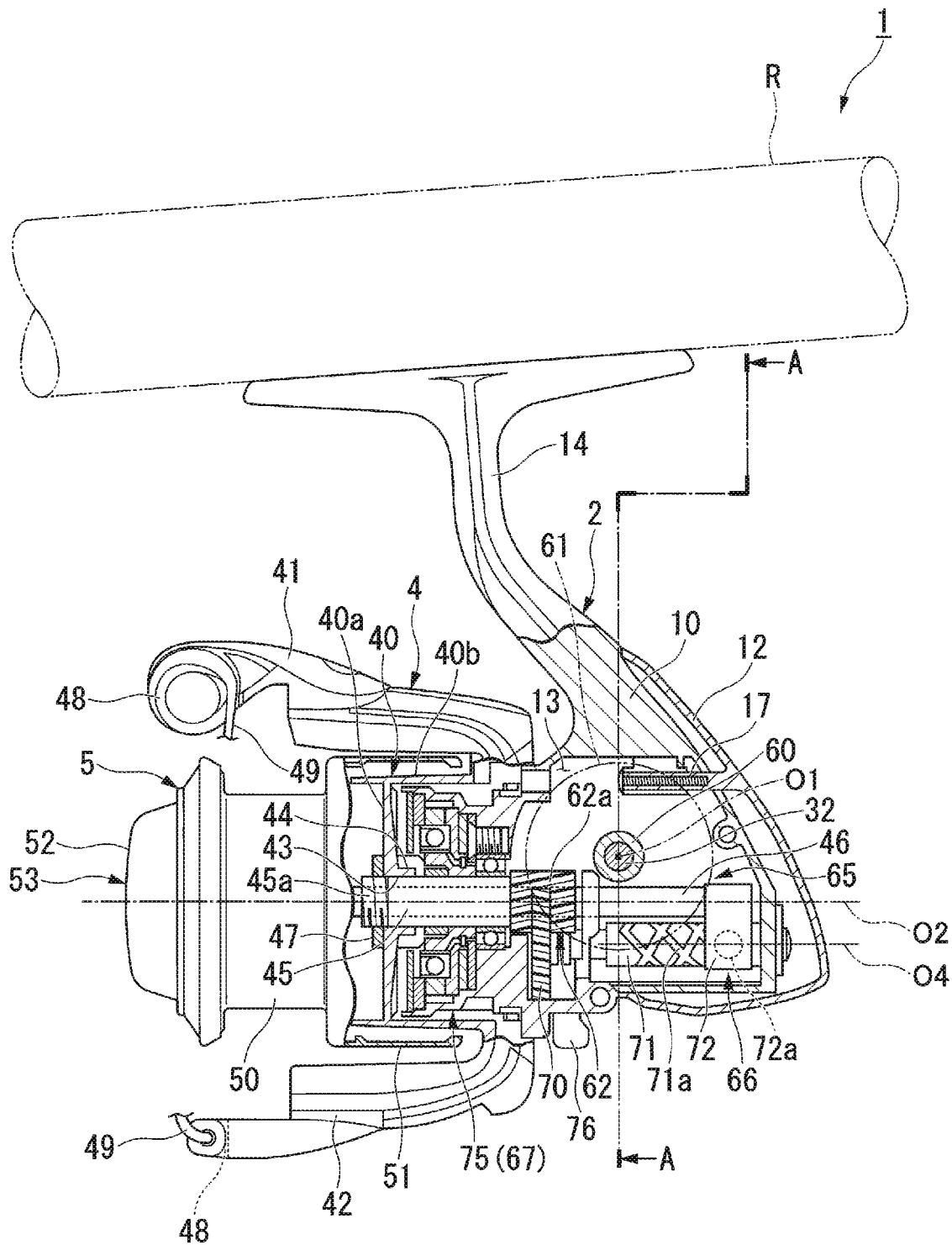
FIG. 2 is a side view including a partial cross section of the spinning reel shown in FIG. 1.
Figure 3:
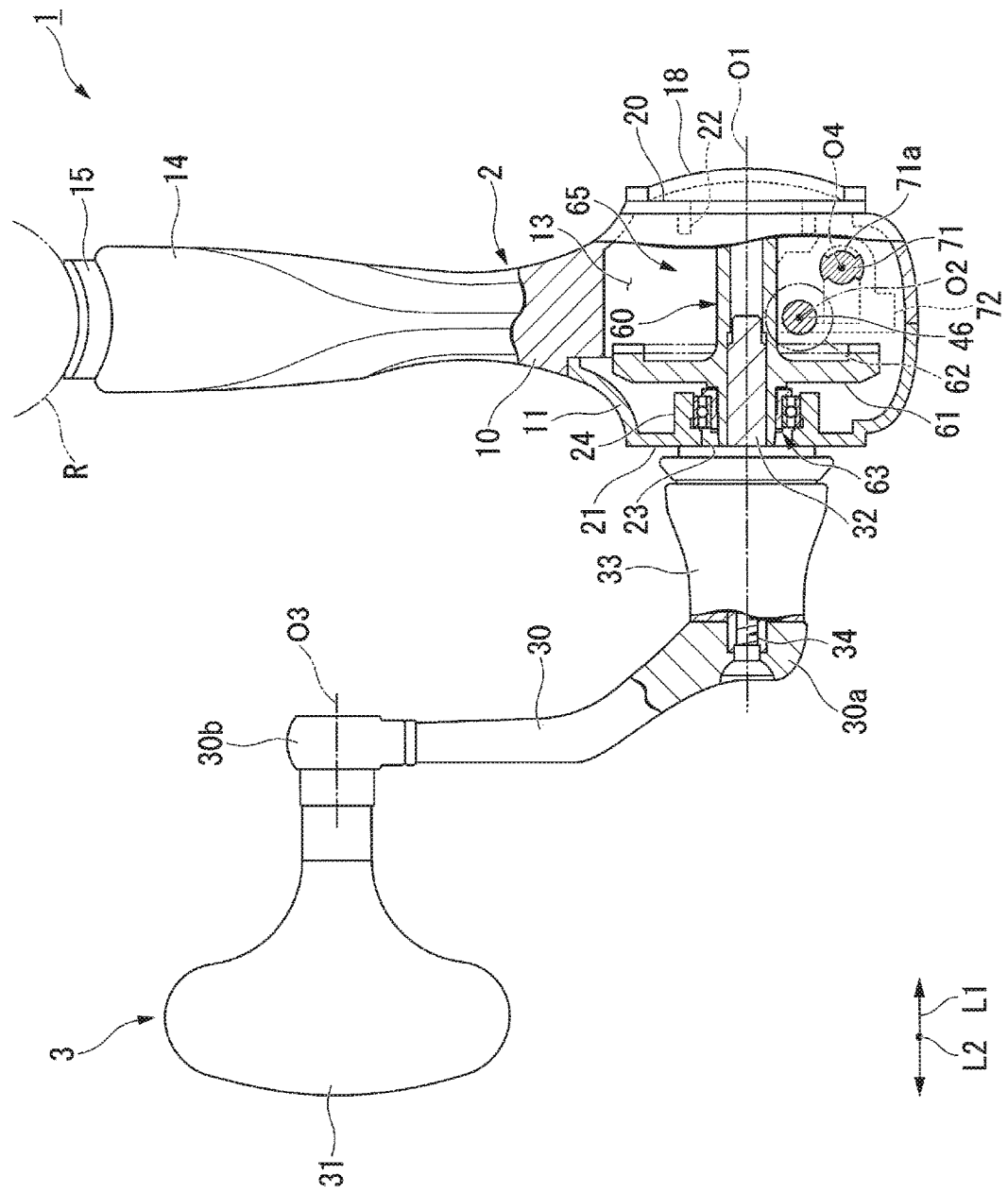
FIG. 3 shows a cross section of the spinning reel through line A-A in FIG. 2.

As shown in FIGS. 1-3, the spinning reel 1 of the present embodiment mainly comprises a reel body 2, a handle 3 that is attached to the reel body 2 to rotate about a first axis O1, a rotor 4 that is combined with the reel body 2 so as to be capable of rotating about a second axis O2, and a spool 5 that is combined with the reel body 2 so as to be capable of moving along the second axis O2 in reciprocating fashion.

The first axis O1 and the second axis O2 are substantially orthogonal to each other. In addition, in the present embodiment, the direction along the first axis O1 is defined as the left-right direction L1, and the direction along the second axis O2 is defined as the longitudinal direction L2. Additionally, the direction in which the fishing line is unwound from the spool 5 (cast) in the longitudinal direction L2 is defined as the front, the opposite direction thereto is defined as the rear, and left and right are defined according to a rear view (state shown in FIG. 3) of the spinning reel 1 as seen from the rear.

Furthermore, the direction that intersects the first axis O1 in a plan view of the first axis O1 as seen from the axial direction thereto (left-right direction L1) may be referred to as the radial direction, and the direction encircling the first axis O1 may be referred to as the circumferential direction. Similarly, the direction that intersects the second axis O2 in a plan view of the second axis O2 as seen from the axial direction thereto (longitudinal direction L2) may be referred to as the radial direction, and the direction encircling the second axis O2 may be referred to as the circumferential direction. Furthermore, in the radial direction of the first axis O1, the direction from the first axis O1 to a fishing rod R is referred to as upward, and the opposite direction is referred to as downward.

Reel Body

The reel body 2 comprises a body portion 10, a lid part 11, and a guard member 12.

The body portion 10 is a molded part made from a light alloy such as a magnesium alloy or an aluminum alloy, and a housing space 13 for housing various reel component members is formed therein. A leg portion 14 is integrally formed on the upper part of the body portion 10 so as to extend upwardly. A mounting piece 15 for mounting to the fishing rod R is formed at the upper end part of the leg portion 14 so as to extend along the fishing rod R.

The lid part 11 is a molded piece made from a light alloy similar to that of the body portion 10 and is detachably fixed to the body portion 10. The above-described housing space 13 is closed by the lid part 11 so as to be, for example, liquid tight. The method of fixing the lid part 11 to the body portion 10 is not particularly limited, and can entail the utilization, for example, of a plurality of fixing bolts, including a fixing bolt 16 that is disposed in a part of the body portion 10 that is positioned on the rear side of the rotor 4.

The guard member 12 is a cover part that covers the rear part of the body portion 10 and the rear portion of the lid part 11 from the rear side. However, the guard member 12 is not a necessary component, and thus need not be provided. The guard member 12 is detachably fixed toward the rear part of the body portion 10 with a fixing bolt 17 that is inserted in the body portion 10 from the rear side of the housing space 13.

As shown in FIG. 3, a flat first mounting wall 20 for mounting the handle 3 or a cap 18 is formed on the right-hand side surface of the body portion 10. A corresponding flat second mounting wall 21 for mounting the handle 3 or the cap 18 is formed on the left-hand side surface of the lid part 11. In the illustrated example, the cap 18 is mounted on the first mounting wall 20 side and the handle 3 is mounted on the second mounting wall 21 side.

That is, the spinning reel of the present embodiment is an example of a left handle spinning reel. However, as described further below, it is possible to switch the spinning reel to a right handle spinning reel by mounting the handle 3 on the side of the first mounting wall 20. In that case, the cap 18 is mounted on the second mounting wall 21.

A first mounting hole 22 is formed in the first mounting wall 20 to extend through the body portion 10 in the left-right direction L1. Similarly, a second mounting hole 23 is formed in the second mounting wall 21 to extend through the lid part 11 in the left-right direction L1. The first mounting hole 22 and the second mounting hole 23 are formed coaxially with the first axis O1 and are disposed opposing each other in the left-right direction L1 across the housing space 13.

Figure 4:
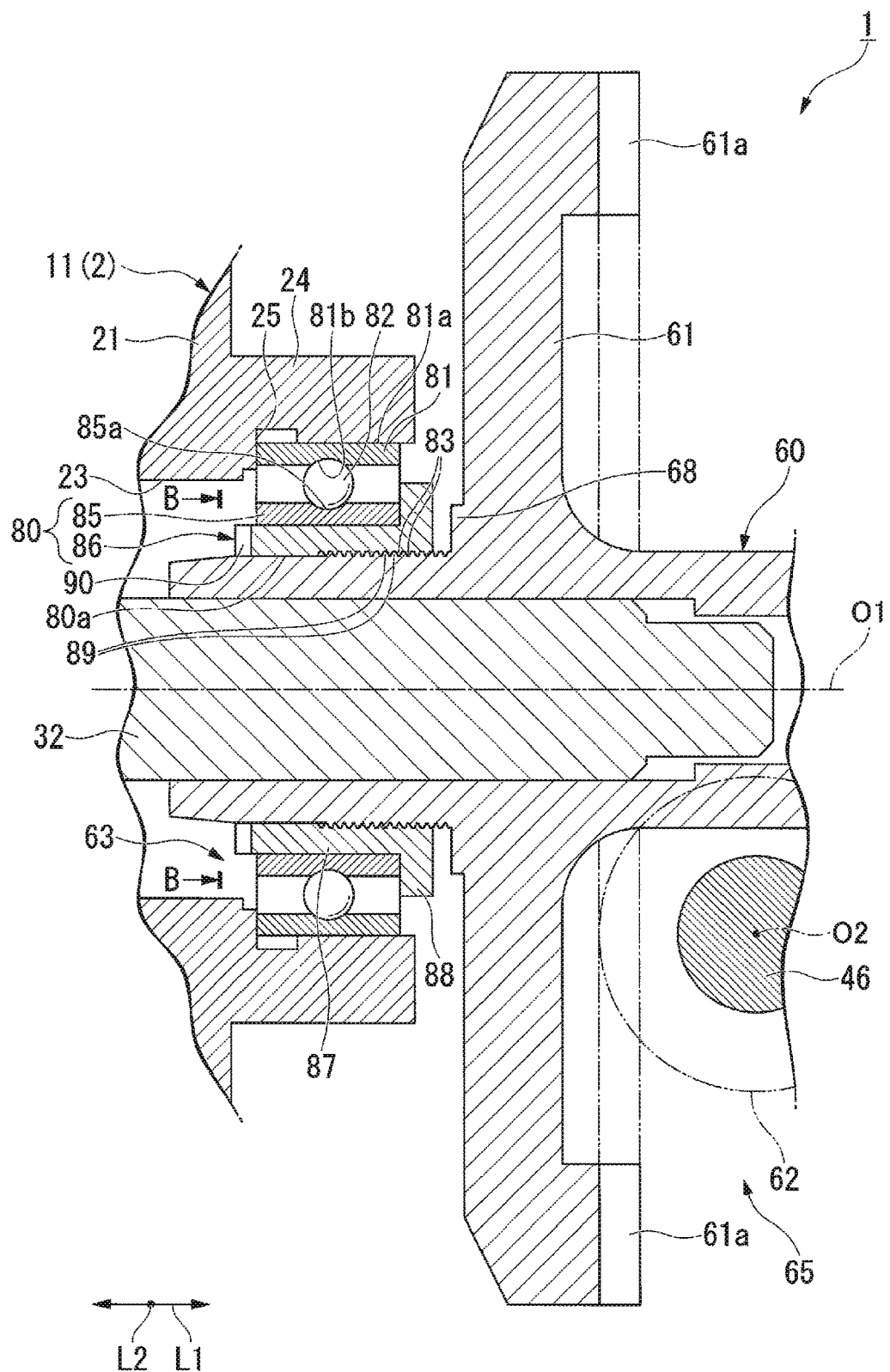
FIG. 4 shows an enlarged cross section of the periphery of the shaft bearing of FIG. 3.

As shown in FIG. 4, a cylindrical supporting tube 24 that projects toward the inside of the of housing space 13, and the inner side of which communicates with the inside of the second mounting hole 23, is formed on the second mounting wall 21. The supporting tube 24 is disposed coaxially with the first axis O1, and the internal diameter thereof is formed to be slightly larger than the internal diameter of the second mounting hole 23. The portion of the second mounting wall 21 that is positioned on the inner side of the supporting tube 24 functions as an annular abutting surface 25 that faces rearward.

Handle

As shown in FIG. 3, the handle 3 comprises a handle arm 30, a handle knob 31, a handle shaft 32, and a handle collar 33.

The handle arm 30 is extends in the radial direction of the first axis O1, and the proximal end portion 30a thereof is formed on the left side of the second mounting wall 21. The handle knob 31 is attached to the distal-end portion 30b of the handle arm 30 so as to be rotatable about a third axis O3 that is parallel to the first axis O1.

The handle shaft 32 is integrally connected to the proximal-end portion 30a of the handle arm 30 via, for example, a coupling screw 34, and is inserted into the reel body 2 from the left side through the second mounting hole 23 in coaxial disposition with the first axis O1. The handle shaft 32 is connected to a cylindrical drive shaft 60, described below, by insertion into the drive shaft 60. The handle shaft 32 and the drive shaft 60 are connected so as to be rotationally fixed so as to rotate about the first axis O1.

The handle 3 is thereby attached to the reel body 2 so as to be rotatable about the first axis O1, as described above. In addition, it is possible to rotate the drive shaft 60 about the first axis O1 via the handle shaft 32 by rotating the handle 3 about the first axis O1.

The handle collar 33 is disposed between the proximal end portion 30a of the handle arm 30 and the second mounting wall 21 and is formed in a cylindrical shape that covers a portion of the handle shaft 32 that is positioned between the second mounting wall 21 and the proximal end portion 30a of the handle arm 30 from the outer side in the radial direction. The handle collar 33 is rotatable about the first axis O1 together with the proximal end portion 30a of the handle arm 30.

The handle 3 configured as described above can be detached from the second mounting wall 21 so that the handle shaft 32 is drawn out from the drive shaft 60, and the handle 3 can be attached on the side of the first mounting wall 20 to thereby switch to the right handle mode. In that embodiment, by insertion of the handle shaft 32 into the interior of the reel body 2 from the right side through the first mounting hole 22 and into the interior of the drive shaft 60, the handle shaft 32 and the drive shaft 60 are connected so as to be rotationally fixed with rotation about the first axis O1.

A cap 18 for closing the first mounting hole 22 is detachably attached to the first mounting wall 20. In the embodiment in which the handle 3 is attached to the first mounting wall 20 side, the cap 18 is configured to be mountable on the side of the second mounting wall 21 so as to close the second mounting hole 23.

Rotor

As shown in FIG. 1 and FIG. 2, the rotor 4 is disposed on the front side of the reel body 2 coaxially with the second axis O2 and comprises a cylindrical body 40 that is formed as a topped cylinder shape having a front wall portion 40a and a peripheral wall portion 40b, and a first arm portion 41 and a second arm portion 42 that are connected to the peripheral wall portion 40b.

The cylindrical body 40 is open at the rear and is combined with the reel body 2 from the front side so as to surround the front portion side of the reel body 2 from the outside in the radial direction. A cylindrical boss portion 44, in which a through-hole 43 is formed that extends through the front wall portion 40a in the longitudinal direction L2, is formed in the central portion of the front wall portion 40a so as to project rearwardly. The through-hole 43 is formed coaxially with the second axis O2. A cylindrical pinion shaft 45 and a spool shaft 46 are inserted through the through-hole 43 into the interior of the boss portion 44.

The pinion shaft 45 is configured to be rotatable about the second axis O2, and the distal-end portion thereof extends farther forward than the front wall portion 40a. The front wall portion 40a is integrally connected to the pinion shaft 45 with a nut 47 that is attached to the front-end portion of the pinion shaft 45.

The rotor 4 is thereby combined with the reel body 2 so as to be rotatable about the second axis O2.

The first arm portion 41 and the second arm portion 42 are connected to the rear-end portion of the peripheral wall portion 40b and are disposed to oppose each other in the radial direction across the second axis O2. The first arm portion 41 and the second arm portion 42 are formed extending forward from the rear-end portion of the peripheral wall portion 40b, and the front-end portions thereof project farther forward than the front wall portion 40a.

A line roller 48 is attached to the front-end portion of the first arm portion 41 in a rotatable fashion, and one end part of a bail arm 49 is attached to the front-end portion of the first arm portion 41 in a pivotable fashion. The line roller 48 is attached to the front-end portion of the second arm portion 42 in a rotatable fashion, and the other end part of the bail arm 49 is attached to the front-end portion of the first arm portion 41 in a pivotable fashion.

The line roller 48 guides the fishing line to the spool 5. The bail arm 49 is disposed so as to connect the first arm portion 41 and the second arm portion 42 and is configured to be pivotable between a line-guiding position (the state shown in FIG. 1 and FIG. 2) for guiding the fishing line to the line roller 48, and a line-releasing position, which is the reverse of the line-guiding position. It is possible to wind the fishing line onto the spool 5 via the line roller 48 by rotating the rotor 4 about the second axis O2 in a state in which the bail arm 49 is positioned in the line-guiding position.

Spool

The spool 5 comprises a bobbin trunk 50, around which the fishing line is wound, and a cylindrical skirt portion 51 that extends from the rear-end portion of the bobbin trunk 50 rearwards and surrounds the peripheral wall portion 40b of the cylindrical body 40 of the rotor 4 from the outer side in the radial direction and is disposed on the front side of the rotor 4 coaxially with the second axis O2.

The spool 5 is disposed so that the bobbin trunk 50 is positioned between the first arm portion 41 and the second arm portion 42 and is detachably fixed to the front-end portion of the spool shaft 46, which is disposed coaxially with the second axis O2. The spool shaft 46 is configured to move in reciprocating fashion along the second axis O2 by an oscillation mechanism 66, described further below. The spool 5 is thereby configured to move in reciprocating fashion along the second axis O2 with respect to the reel body 2.

A drag adjustment mechanism 53 comprising a braking mechanism (brake), not shown, which is disposed on the inner side of the bobbin trunk 50 and brakes the rotation of the spool 5, and a drag adjustment knob 52, which is attached to the front-end portion of the bobbin trunk 50 so as to rotate about the second axis O2 and which adjusts the braking force of the braking mechanism, is attached to the spool 5.

As shown in FIG. 2 and FIG. 3, a cylindrical drive shaft 60, a drive gear 61, a pinion gear 62, and a shaft bearing 63 are disposed inside the housing space 13 of the reel body 2. The cylindrical drive shaft 60 is supported by the reel body 2 so as to be rotatable about the first axis O1 and is connected to the handle 3 by the handle shaft 32. The drive gear 61 is formed on the drive shaft 60. The pinion gear 62 meshes with the drive gear 61 and rotates about the second axis O2 with rotation of the drive shaft 60. The shaft bearing 63 is disposed between the drive gear 61 and the reel body 2 and supports the drive shaft 60 so as to be rotatable about the first axis O1.

Furthermore, a rotor drive mechanism 65 that rotates the rotor 4 about the second axis O2 with the rotation of the handle 3, an oscillation mechanism 66 that moves the spool 5 in reciprocating fashion (back-and-forth) in the direction of the second axis O2 with the rotation of the handle 3, and an anti-reverse rotation mechanism 67 of the rotor 4 are further provided within the housing space 13 of the reel body 2.

Rotor Drive Mechanism

The rotor drive mechanism 65 mainly includes the drive shaft 60, the drive gear 61, and the pinion gear 62 described above.

As shown in FIG. 3 and FIG. 4, the drive shaft 60 is a cylindrical part made from a cold-forged metal, for example, that is disposed coaxially with the first axis O1, both ends of which are open in the left-right direction L1. The left-end portion of the drive shaft 60 is disposed on the inner side of the second mounting hole 23 that is formed on the lid part 11 of the reel body 2 and is supported by the shaft bearing 63 described above so as to be rotatable about the first axis O1 as well as capable of being held by the lid part 11 via the shaft bearing 63. The right-end portion of the drive shaft 60 is disposed on the inner side of the first mounting hole 22 that is formed on the body portion 10 of the reel body 2 and is supported by a shaft bearing, not shown, so as to be rotatable about the first axis O1 as well as capable of being held by the body portion 10 via the shaft bearing.

As described above, the handle shaft 32 is inserted into the interior of the drive shaft 60 from the left side and is connected in a rotationally fixed manner to the drive shaft 60. The drive shaft 60 is thereby rotated about the first axis O1 as the handle 3 is rotated. In the illustrated example, the handle shaft 32 is inserted from the left side of the drive shaft 60 so that the distal-end portion is positioned on the right side of the drive gear 61.

The drive gear 61 is formed, for example, integrally with the drive shaft 60. However, the invention is not limited to this case, and the drive gear 61 may be formed separately from the drive shaft 60 and then subsequently integrally combined with the drive shaft 60.

The drive gear 61 is formed on a portion of the drive shaft 60 that is positioned on the right side of the supporting tube 24 that is formed on the lid part 11 of the reel body 2 and on a portion that is positioned on the left side of the pinion gear 62. A plurality of tooth portions 61a that face rearwards are formed over the entire circumference on the outer peripheral edge side of the drive gear 61.

An annular flange portion 68 that projects radially outwards is formed on the outer circumferential surface of the left-end portion of the drive shaft 60. The flange portion 68 is integrally formed on the left wall surface of the drive gear 61.

As shown in FIG. 2, the pinion gear 62 is integrally formed with a cylindrical pinion shaft 45 that is disposed coaxially with the second axis O2. In the illustrated example, the pinion shaft 45 is disposed so as to be positioned below the drive shaft 60 and positioned on the right side of the drive shaft 60. The pinion shaft 45 is supported by a plurality of shaft bearings to be rotatable about the second axis O2 and is held by the reel body 2 via the plurality of shaft bearings.

The pinion shaft 45 is inserted from the rear into the through-hole 43 that is formed in the boss portion 44 of the rotor 4, and the front-end portion thereof projects farther forward than the front wall portion 40a of the rotor 4. Screw threads 45a are formed in the outer circumferential surface of the front-end portion of the pinion shaft 45, and a nut 47 is attached by the screw threads 45a. As described above, the pinion shaft 45 and the rotor 4 are thereby integrally connected.

The spool shaft 46 is inserted on the inner side of the pinion shaft 45 so as to be relatively movable in the second axis O2 direction. The rear-end portion of the spool shaft 46 is positioned behind the pinion shaft 45 and the drive shaft 60.

The pinion gear 62 has helical teeth 62a that mesh with the teeth 61a of the drive gear 61 and rotates about the second axis O2 with the rotation of the drive shaft 60 and the drive gear 61. It thereby is possible to rotate the rotor 4 about the second axis O2 via the pinion gear 62 and the pinion shaft 45.

Therefore, the rotor drive mechanism 65 transmits the rotational force that is generated by the rotation of the handle 3 to the rotor 4.

Oscillation Mechanism

As shown in FIG. 3 and FIG. 4, the oscillation mechanism 66 comprises an intermediate gear 70 that meshes with the pinion gear 62, a threaded shaft 71 that is disposed parallel to the spool shaft 46, and a slider 72 that moves back and forth along the threaded shaft 71 with the rotation of the threaded shaft 71.

The threaded shaft 71 is disposed parallel to and below the spool shaft 46, and a helical groove portion 71a forming a so-called traverse cam groove is formed on the outer circumferential surface thereof. The threaded shaft 71 is supported by the reel body 2 so as to be rotatable about a fourth axis O4 that is parallel to the second axis O2. The intermediate gear 70 is connected to the distal-end portion of the threaded shaft 71. The intermediate gear 70 and the threaded shaft 71 are thereby rotated as the pinion gear 62 rotates.

The slider 72 is connected to the rear-end portion of the spool shaft 46 so as to be rotationally fixed with respect to the spool shaft 46. The slider 72 comprises an engagement piece 72a that engages the grooved portion 71a of the threaded shaft 71 so as to be relatively movable along the grooved portion 71a. The slider 72 is guided by a guide shaft, not shown, that is disposed parallel to the threaded shaft 71, and is configured to be movable while being guided by the guide shaft in the fourth axis O4 direction.

Thus, because the slider 72 is prevented from corotating about the fourth axis O4 as the threaded shaft 71 is rotated by the guide shaft, the rotational force of the threaded shaft 71 is converted into a linear force by the groove portion 71a and the engagement piece 72a. It is thereby possible for the slider 72 to move in reciprocating fashion along the threaded shaft 71 in the direction of the fourth axis O4 as the threaded shaft 71 is rotated, and for the spool shaft 46, which is fixed to the slider 72, to move in reciprocating fashion in the direction of the second axis O2.

Thus, the oscillation mechanism 66 converts the rotational force that is generated by the rotation of the handle 3 into a linear motive force and transmits the motive force to the spool 5.

Anti-Reverse Rotation Mechanism

As shown in FIG. 2, the anti-reverse rotation mechanism 67 permits the rotation of the rotor 4 in the fishing line-winding direction and prevents the rotation of the rotor 4 in the opposite, line-releasing or casting direction (that is, reverse rotation), and, for example, comprises a one-way clutch 75 that is disposed on the inner side of the cylindrical body 40 of the rotor 4.

The anti-reverse rotation mechanism 67 is not limited to the configuration described above, and various well-known configurations may be employed. A switching lever 76 that switches the one-way clutch 75 between the above-described operating state (reverse rotation prevention state) and a non-operating state (reverse rotation permitted state) is disposed on the lower portion side of the reel body 2.

Shaft Bearing

The shaft bearing 63 that supports the left-end portion of the drive shaft 60 around the first axis O1 will be described in detail.

As shown in FIG. 4, in addition to supporting the drive shaft 60 around the first axis O1, the shaft bearing 63 functions as an adjustment member that moves the drive shaft 60 relative to the reel body 2 in the first axis O1 direction (left-right direction L1) and adjusts the positions of the drive shaft 60 and the drive gear 61 in the first axis O1 direction.

The shaft bearing 63 is disposed between the left-end portion of the drive shaft 60 and the supporting tube 24 of the lid part 11 of the reel body 2. The shaft bearing 63 comprises an inner race 80 that surrounds the left-end portion of the drive shaft 60 from the radially outer side and that has an inner bearing surface 80a that contacts the outer circumferential surface of the drive shaft 60 in at least part of the inner circumferential surface, an outer race 81 that surrounds the inner race 80 from the radially outer side and that has an outer bearing surface 81a that contacts the inner circumferential surface of the supporting tube 24 of the lid part 11 in at least part of the outer circumferential surface, and a plurality of rolling elements 82 that are rollably held between the inner race 80 and the outer race 81.

In addition, at least one of the inner circumferential surface of the inner race 80 and the outer circumferential surface of the outer race 81 includes an adjustment portion that moves the drive shaft 60 relative to the reel body 2 in the first axis O1 direction when the shaft bearing 63 is moved relative to the drive shaft 60 and the reel body 2 (for example, rotated or slid).

In one embodiment, a first threaded portion 83 formed on the inner race 80 side is the adjustment portion, and when the inner race 80 is rotated about the first axis O1 with respect to the reel body 2 and the drive shaft 60, the drive shaft 60 is moved relative to the reel body 2 in the first axis O1 direction. This structure will be described as an example.

The outer race 81 is formed with a cylindrical shape from, for example, stainless steel, and is fitted on the inner side of the supporting tube 24. The outer circumferential surface of the outer race 81 is in contact with the inner circumferential surface of the supporting tube 24 over the entire surface. Accordingly, the entire outer circumferential surface of the outer race 81 is defined as the outer bearing surface 81a. An outer annular groove 81b that extends continuously along the circumferential direction is formed on the inner circumferential surface of the outer race 81.

The left end surface of the outer race 81 is in contact with (abuts) an abutting surface 25 of the second mounting wall 21 of the lid part 11 from the right side and is thereby positioned in the first axis O1 direction.

The inner race 80 comprises an inner race body (first inner race portion) 85 that is disposed on the radially inner side of the outer race 81 and that holds rolling elements between itself and the outer race 81, and a collar (second inner race portion) 86 that is disposed between the inner race body 85 and the drive shaft 60.

The inner race body 85 is formed with a cylindrical shape from, for example, stainless steel, in the same manner as the outer race 81. An inner annular groove 85a that continuously extends along the circumferential direction is formed on the outer circumferential surface of the inner race body 85 and opposes the outer annular groove 81b in the radial direction.

The rolling elements 82 are rollably disposed between the outer annular groove 81b and the inner annular groove 85a in a state of being equally spaced in the circumferential direction and are positioned in the circumferential direction by a retainer, which is not shown.

The collar 86 is made of metal, for example, and comprises a cylindrical collar tube 87 that is fitted on the inner side of the inner race body 85, and a flange portion 88 that is formed so as to project radially outwards from the right-end portion of the collar tube 87.

The collar tube 87 projects farther to the right side than the inner race body 85. The inner circumferential surface of the portion of the collar tube 87 that is positioned closer to the left-end portion of the collar tube 87 is in contact with the outer circumferential surface of the drive shaft 60. The inner circumferential surface of the portion positioned closer to the left-end portion of the collar tube 87 is thus defined as the inner bearing surface 80a.

A first threaded portion 83 (for example, a male threaded portion) that functions as an adjustment portion is formed on the inner circumferential surface of the portion of the collar tube 87 that is positioned on the right side of the inner bearing surface 80a. Accordingly, the first threaded portion 83 is formed so as to be aligned with the inner bearing surface 80a in the first axis O1 direction.

A second threaded portion 89 (for example, a female threaded portion) that screws onto the first threaded portion 83 is formed on a portion of the outer circumferential surface of the left-end portion of the drive shaft 60. The second threaded portion 89 functions as an adjustment target portion that moves the drive shaft 60 relative to the reel body 2 in the first axis O1 direction in cooperation with the first threaded portion 83. The first threaded portion 83 and the second threaded portion 89 are screwed together with a predetermined meshing force.

Figure 5:
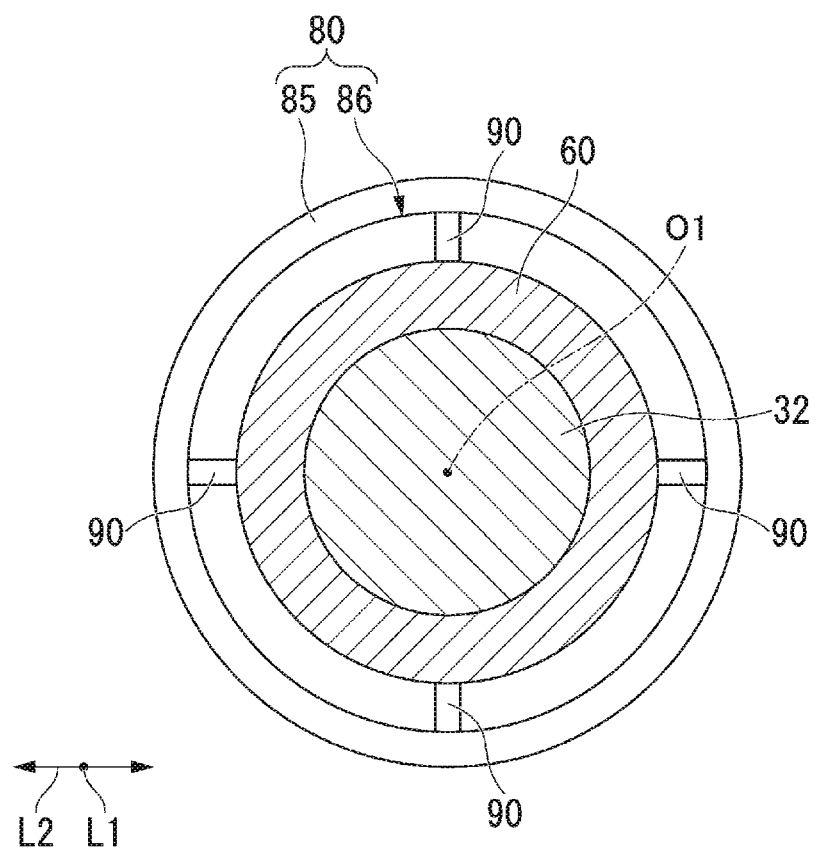
FIG. 5 shows a cross section of the spinning reel through line B-B in FIG. 4.

As shown in FIG. 4 and FIG. 5, slit-shaped operation grooves 90 that extend radially are formed on the left-end surface of the collar tube 87. In the illustrated example, four operation grooves 90 are formed at equal intervals in the circumferential direction so as to be arranged in the form of a cross. However, the arrangement and number of the operation grooves 90 are not limited in this way and may be designed in any manner desired.

As shown in FIG. 4, the collar tube 87 is disposed farther on the radially inner side of the inner circumferential surface of the second mounting hole 23. Accordingly, it is possible to access the collar tube 87 from the outside of the reel body 2 through the second mounting hole 23 by removing the handle 3 from the lid part 11 of the reel body 2. It is thereby possible to insert, for example, a tool, not shown, inside the second mounting hole 23 from the outside of the reel body 2 and engage the operation grooves 90 with the tool to rotate the collar 86 about the first axis O1.

The flange portion 88 is disposed on the right side of the inner race body 85 and is in contact with the inner race body 85 from the right side. A set gap in the first axis O1 direction is ensured between the flange portion 88 and the flange portion 68 of the drive shaft 60.

Action of the Spinning Reel

Next, an embodiment in which the spinning reel 1 with the above-described configuration is used will be briefly described.

When casting, a bail arm 49 is dropped from the state shown in FIG. 1 and FIG. 2 to a line-releasing position, and the fishing rod R is swung forward. A fishing line that is wound around the bobbin trunk 50 of the spool 5 can thereby be paid out forward.

Thereafter, when the fishing line is wound up, the bail arm 49 is returned to the line-guiding position, as shown in FIG. 1 and FIG. 2. The fishing line is thereby guided to the line roller 48 by the bail arm 49. In this state, the handle 3 is rotated about the first axis O1. Since the rotational force of the handle 3 is transmitted to the rotor 4 by the rotor drive mechanism 65, it is possible to rotate the rotor 4 about the second axis O2. At the same time, since the rotational force of the handle 3 is transmitted to the spool 5 by the oscillation mechanism 66, it is possible for the spool 5 to move in reciprocating fashion along the second axis O2.

As a result, it is possible to rotate the rotor 4 while the spool 5 moves in a reciprocating fashion in the longitudinal direction L2 and to evenly wind the fishing line onto the bobbin trunk 50 of the spool 5 via the line roller 48.

Adjustment of the Meshing Between the Drive Gear and the Pinion Gear

Next, an embodiment in which the drive shaft 60 is moved relative to the reel body 2 in the first axis O1 direction by utilizing the shaft bearing 63, and the positions of the drive shaft 60 and the drive gear 61 are adjusted in the first axis O1 direction to thereby adjust the meshing between the drive gear 61 and the pinion gear 62 will be described.

This meshing adjustment is carried out, for example, during assembly of the spinning reel 1, when the handle 3 is switched to the left side or right side after product shipment, and at the time of maintenance.

Figure 6:
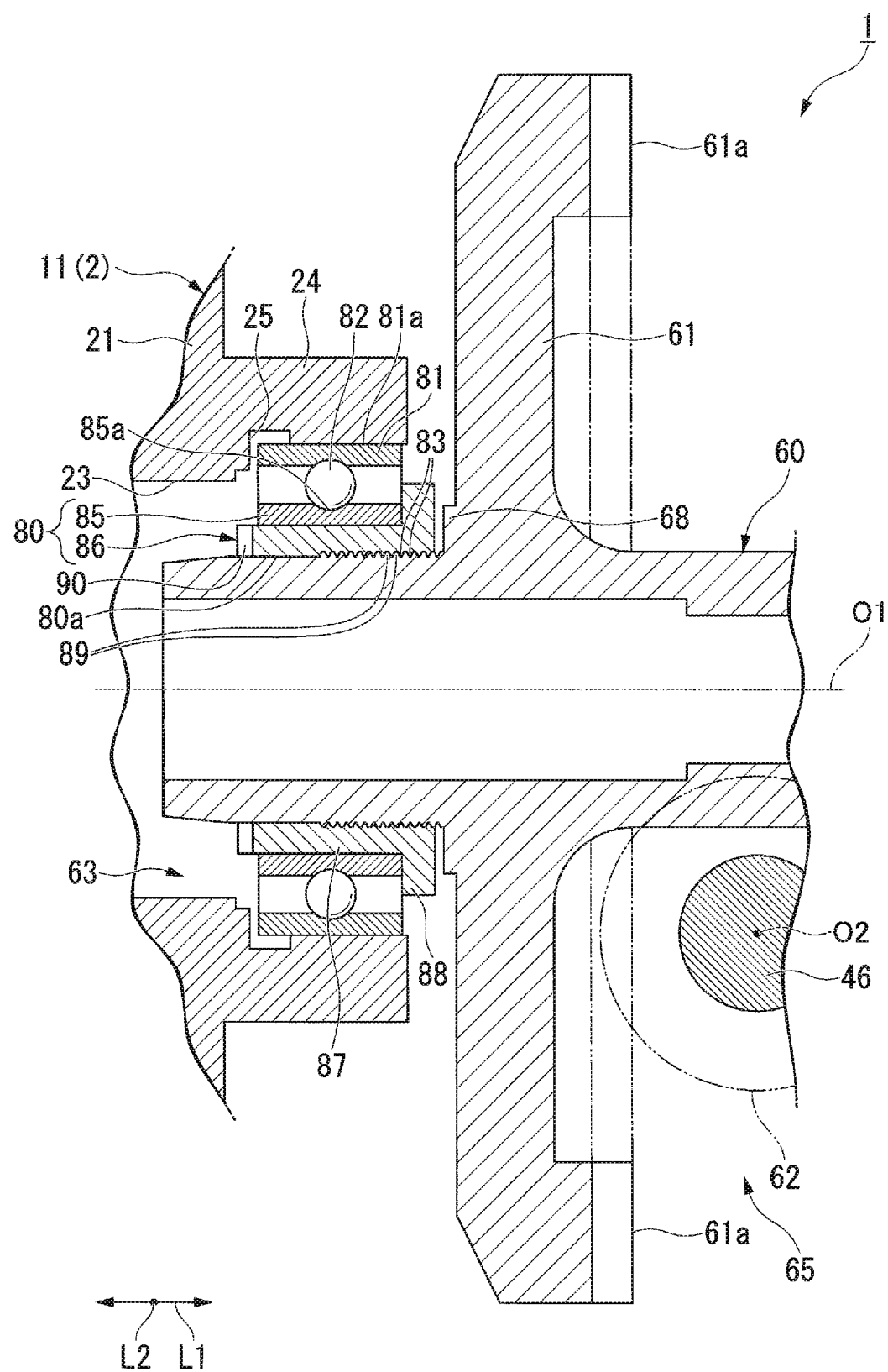
FIG. 6 shows a cross section of the shaft bearing of FIG. 4 in the assembled state between the drive shaft and the reel body.

For example, when adjusting the meshing during assembly of the spinning reel 1, first, each reel component is assembled in the housing space 13 of the body portion 10, after which the lid part 11 is assembled onto the body portion 10 to assemble the reel body 2. At this time, as shown in FIG. 6, the shaft bearing 63 is attached to the left-end portion of the drive shaft 60, after which the lid part 11 is assembled onto the body portion 10.

For attachment of the shaft bearing 63, it is possible to attach the entire shaft bearing 63 to the left-end portion of the drive shaft 60 by screwing the first threaded portion 83 of the collar 86 onto the second threaded portion 89 that is formed on the left-end portion of the drive shaft 60. By thereafter assembling the lid part 11 onto the body portion 10, it is possible to fit the outer race 81 of the shaft bearing 63 to the inner side of the supporting tube 24 of the lid part 11, and to set the shaft bearing 63 between the supporting tube 24 of the lid part 11 and the drive shaft 60.

At this point, a slight gap (play) in the first axis O1 direction may exist between the outer race 81 of the shaft bearing 63 and the abutting surface 25 of the lid part 11.

Next, the meshing between the drive gear 61 and the pinion gear 62 is adjusted before attachment of the handle 3.

Specifically, a tool, not shown, is inserted into the second mounting hole 23 that is formed in the lid part 11 from the outside of the reel body 2, and the tool engages the operation grooves 90 that are formed on the collar tube 87. Then, while the rotation of the drive shaft 60 about the first axis O1 is restricted, the tool is used to rotate the collar 86 with respect to the reel body 2 and the drive shaft 60. It is possible to restrict the rotation of the drive shaft 60 about the first axis O1 by, for example, holding the rotor 4.

Figure 7:
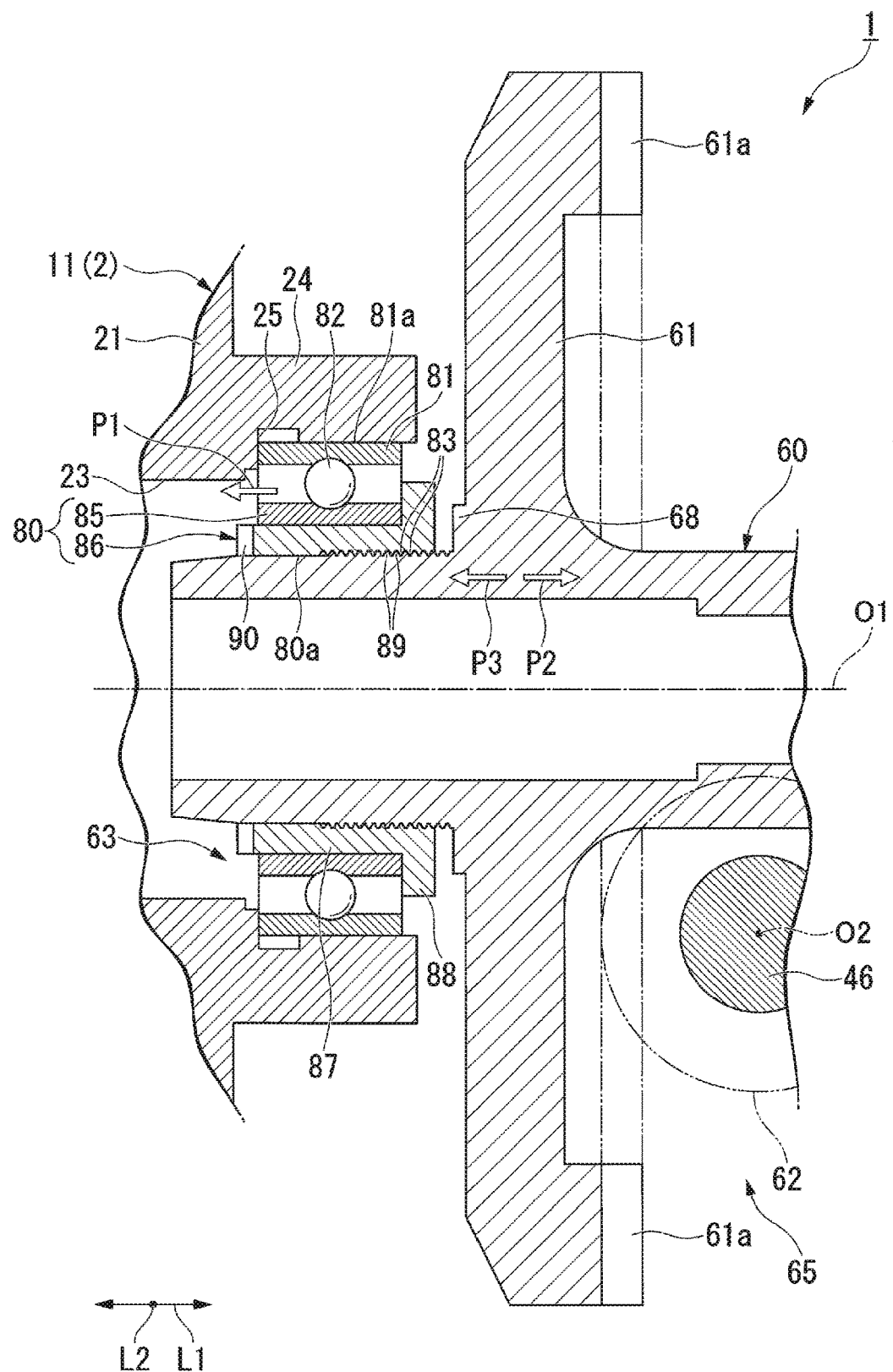
FIG. 7 shows a cross section of the shaft bearing being used to adjust the meshing of the drive gear and the pinion gear after the state shown in FIG. 6.

As shown by arrow P1 in FIG. 7, by rotation of the collar 86, it is possible to move (pull out) the entire shaft bearing 63 to the left side and to bring the outer race 81 of the shaft bearing 63 in contact with (abutting) the abutting surface 25 of the lid part 11 from the right side, to thereby eliminate the above-described gap (play) that is generated at the time of assembling the shaft bearing 63, or to control the play to a minimum.

Thereafter, if the collar 86 is rotated farther in the same direction, it is possible to move the drive shaft 60 to the right side relative to the reel body 2 along the first axis O1 direction, as shown by arrow P2, while maintaining the position of the shaft bearing 63 relative to the reel body 2. It is thereby possible to bring the drive gear 61 close to the pinion gear 62.

On the other hand, with rotation of the collar 86 in the opposite direction it is possible to move the drive shaft 60 to the left side relative to the reel body 2 along the first axis O1 direction, as shown by arrow P3, while maintaining the position of the shaft bearing 63 relative to the reel body 2. It is thereby possible to move the drive gear 61 away from the pinion gear 62.

In this manner, with rotation of the collar 86 it is possible to move the drive shaft 60 relative to the reel body 2 in the first axis O1 direction and to cause the drive gear 61 to approach and move away from the pinion gear 62 in the first axis O1 direction. Accordingly, it is possible to easily and reliably adjust the meshing between the drive gear 61 and the pinion gear 62.

It is then possible to assemble the spinning reel 1 by attaching the handle 3 on the second mounting wall 21 side of the lid part 11 of the reel body 2 after adjustment the meshing between the drive gear 61 and the pinion gear 62, as shown in FIGS. 1-4.

In particular, according to the spinning reel 1 of the present embodiment, as shown in FIG. 4, the inner bearing surface 80a formed on the collar 86 is in surface contact with the outer circumferential surface of the drive shaft 60, and the outer bearing surface 81a formed on the outer race 81 is in surface contact with the supporting tube 24 formed on the lid part 11 of the reel body 2. It is thus a simple matter to control the dimension of the shaft bearing 63 in the radial direction with respect to the drive shaft 60 and the reel body 2, and to dispose the shaft bearing 63 between the drive shaft 60 and the lid part 11 of the reel body 2 with high dimensional accuracy. As a result, it is possible to provide a shaft bearing 63 with excellent rotational accuracy, and to rotatably support the drive shaft 60 stably without degradation of rotational performance.

As a result, it is possible to provide a high-quality, high-performance fishing reel that is capable of providing smooth rotation of the handle with little resistance and smooth winding of the fishing line.

As described above, according to the spinning reel 1 of the present embodiment, it is possible to easily and reliably adjust the meshing between the drive gear 61 and the pinion gear 62 without degradation of the rotational performance of the drive shaft 60.

Furthermore, since both the inner bearing surface 80a and the first threaded portion 83 are formed on the collar 86, and the first threaded portion 83 and the inner bearing surface 80a are disposed side by side in the first axis O1 direction, when the meshing between the drive gear 61 and the pinion gear 62 is adjusted, it is possible to suppress axial displacement of the drive shaft 60, and to adjust the meshing without being affected by axial displacement.

Additionally, because the first threaded portion 83 on the shaft bearing 63 side and the second threaded portion 89 on the drive shaft 60 side are screwed and connected together, it is possible to move the drive shaft 60 relative to the reel body 2 in the first axis O1 direction and to adjust the meshing between the drive gear 61 and the pinion gear 62 by rotating the collar 86 about the first axis O1, by cooperation between the first threaded portion 83 and the second threaded portion 89. In particular, because the first threaded portion 83 and the second threaded portion 89 are screwed and connected together, it is a simple matter to stably move the drive shaft 60 in the first axis O1 direction by a small amount in accordance with a rotation operation of the collar 86, and it is a simple matter to finely and accurately adjust the meshing between the drive gear 61 and the pinion gear 62.

Furthermore, the inner race 80 is configured from the inner race body 85 that holds a plurality of rolling elements 82 between itself and the outer race 81, and a collar 86 on which a first threaded portion 83 is formed. Accordingly, it is possible to rotatably support the drive shaft 60 around the first axis O1 together with the outer race 81 and the rolling elements 82 mainly by utilizing the inner race body 85, and to adjust the meshing between the drive gear 61 and the pinion gear 62 primarily by utilizing the collar 86. It is thus possible to provide a shaft bearing 63 with which the meshing between the drive gear 61 and the pinion gear 62 can be adjusted, and the drive shaft 60 can be rotatably supported in a stable manner.

Second Embodiment

Next, a second embodiment according to the present invention will be described with reference to the drawings. In this second embodiment, the portions that are the same as compositional elements of the first embodiment have been assigned the same reference symbols, and their descriptions have been omitted.

In the first embodiment, both the inner bearing surface 80a and the first threaded portion 83 are formed on the collar 86, but in the present embodiment, the inner bearing surface 80a is formed on the inner race body 85.

Figure 8:
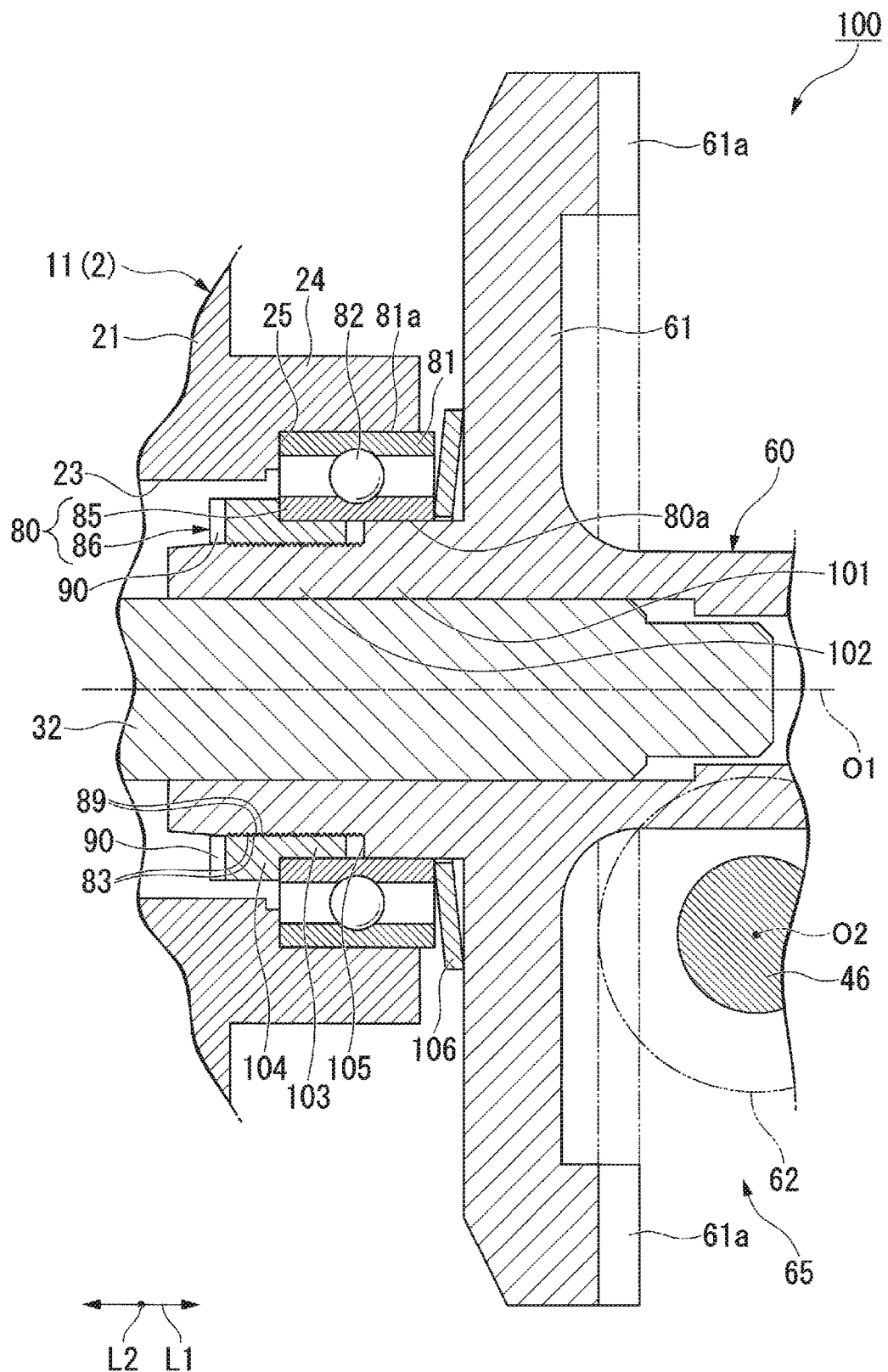
FIG. 8 shows a cross section of a spinning reel according to a second embodiment of the present invention, which is an enlarged cross section of the periphery of the shaft bearing.

As shown in FIG. 8, in a spinning reel 100 of the present embodiment, the left-end portion of the drive shaft 60 is formed in a two-stage cylindrical shape, comprising a first tubular portion 101 that is positioned on the drive gear 61 side, and a second tubular portion 102 that is positioned on the left side of the first tubular portion 101 and that has a smaller diameter than the outer diameter of the first tubular portion 101.

A second threaded portion 89 is formed on the outer circumferential surface of the portion of the second tubular portion 102 that is positioned on the first tubular portion 101 side. However, the second threaded portion 89 may be formed over the entire outer circumferential surface of the second tubular portion 102.

The inner race body 85 is in contact with the outer circumferential surface of the first tubular portion 101 in a state in which a portion thereof projects farther to the left side than the first tubular portion 101. Accordingly, the portion of the inner circumferential surface of the inner race body 85 that is in contact with the outer circumferential surface of the first tubular portion 101 is defined as the inner bearing surface 80a.

The collar 86 comprises a collar tube 103 that is fitted to an inner side of a portion of the inner race main body 85 that projects farther to the left side than the first tubular portion 101, and a flange portion 104 that is formed projecting radially outwards from a portion of the collar tube 103 that projects farther to the left side than the inner race body 85.

A first threaded portion 83 that screws onto the second threaded portion 89 is formed over the entire inner circumferential surface of the collar tube 103. The flange portion 104 is disposed on the left side of the inner race body 85 and is in contact with the inner race body 85 from the left side. In addition, a plurality of operation grooves 90 are formed on the left end surface of the collar tube 103 and the flange portion 104 at intervals in the circumferential direction.

A set gap is ensured in the first axis O1 direction between the right end surface of the collar tube 103 and a stepped surface 105 that is formed between the first tubular portion 101 and the second tubular portion 102 and that faces the left side.

As described above, in the present embodiment, the inner race body 85 and the collar 86 are arranged side by side in the first axis O1 direction, the inner bearing surface 80a is formed on the inner race body 85, and the first threaded portion 83 is formed on the collar 86. Therefore, even in the present embodiment, the inner bearing surface 80a and the first threaded portion 83 are arranged side by side in the first axis O1 direction.

Furthermore, a disc spring (inner race biasing member) 106 for pressing the inner race body 85 against the collar 86 is attached between the shaft bearing 63 and the drive gear 61. The disc spring 106 is formed in an annular shape that surrounds the first tubular portion 101 of the drive shaft 60 from the outer side of the circumferential direction and is disposed coaxially with the first axis O1 between the inner race body 85 and the drive gear 61.

The disc spring 106 is disposed between the inner race body 85 and the drive gear 61 in a state of being compressively deformed in the first axis O1 direction, and the inner peripheral portion thereof is in contact with the inner race body 85 from the right side while the outer peripheral portion thereof is in contact with the drive gear 61 from the left side. As a result, the disc spring 106 constantly biases the inner race body 85 by pressing to the left side by its own elastic restorative force.

Adjusting the Meshing Between the Drive Gear and the Pinion Gear

Described next is a process in which the meshing between the drive gear 61 and the pinion gear 62 is adjusted in the spinning reel 100 according to the present embodiment configured as described above.

Figure 9:
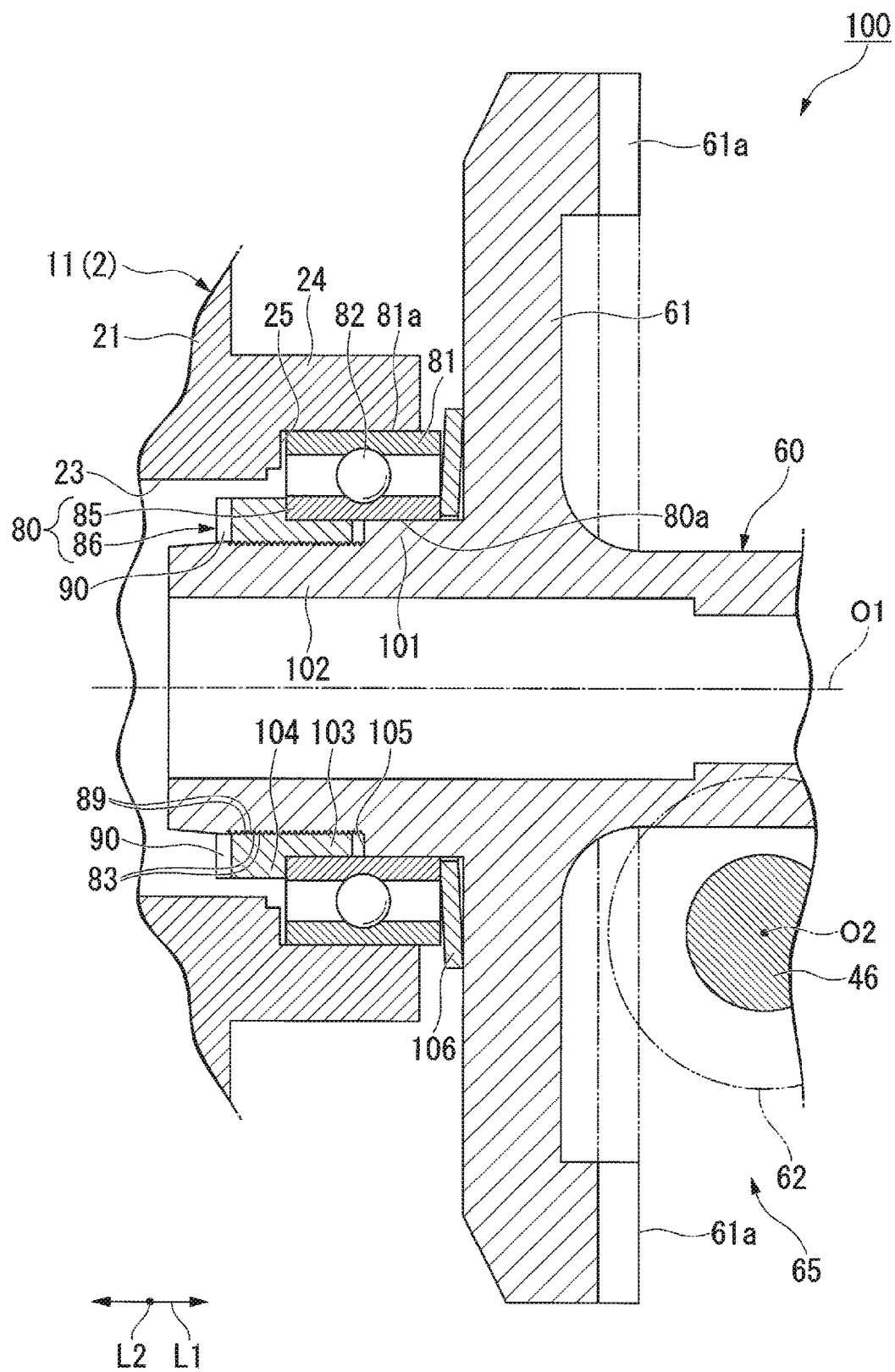
FIG. 9 shows a cross section of the state in which the shaft bearing shown in FIG. 8 is assembled between the drive shaft and the reel body.

For example, when the meshing is adjusted at the time of assembly of the spinning reel 100, as shown in FIG. 9, the shaft bearing 63 is attached to the left-end portion of the drive shaft 60, after which the lid part 11 is assembled onto the body portion 10.

When attaching the shaft bearing 63, it is possible to attach the entire shaft bearing 63 to the left-end portion of the drive shaft 60 by screwing the first threaded portion 83 of the collar 86 onto the second threaded portion 89 that is formed on the second tubular portion 102 of the drive shaft 60, after attaching the disc spring 106 to the first tubular portion 101 of the drive shaft 60 from the left side. At this time, the disc spring 106 is gradually sandwiched between the inner race body 85 and the drive gear 61 and subjected to compressive deformation, as the first threaded portion 83 is tightened.

By thereafter assembling the lid part 11 onto the body portion 10, it is possible to fit the outer race 81 of the shaft bearing 63 to the inner side of the supporting tube 24 of the lid part 11, and to set the shaft bearing 63 between the supporting tube 24 of the lid part 11 and the drive shaft 60. At this stage, there may be a slight gap (play) in the first axis O1 direction between the outer race 81 of the shaft bearing 63 and the abutting surface 25 of the lid part 11.

Next, the meshing between the drive gear 61 and the pinion gear 62 is adjusted before attaching the handle 3. Specifically, a tool, which is not shown, is inserted into the second mounting hole 23 that is formed in the lid part 11 from the outside of the reel body 2, and the tool engages the operation grooves 90 that are formed on the collar tube 103 and the flange portion 104. Then, while the rotation of the drive shaft 60 about the first axis O1 is restricted, the tool is used to rotate the collar 86 with respect to the reel body 2 and the drive shaft 60.

Figure 10:
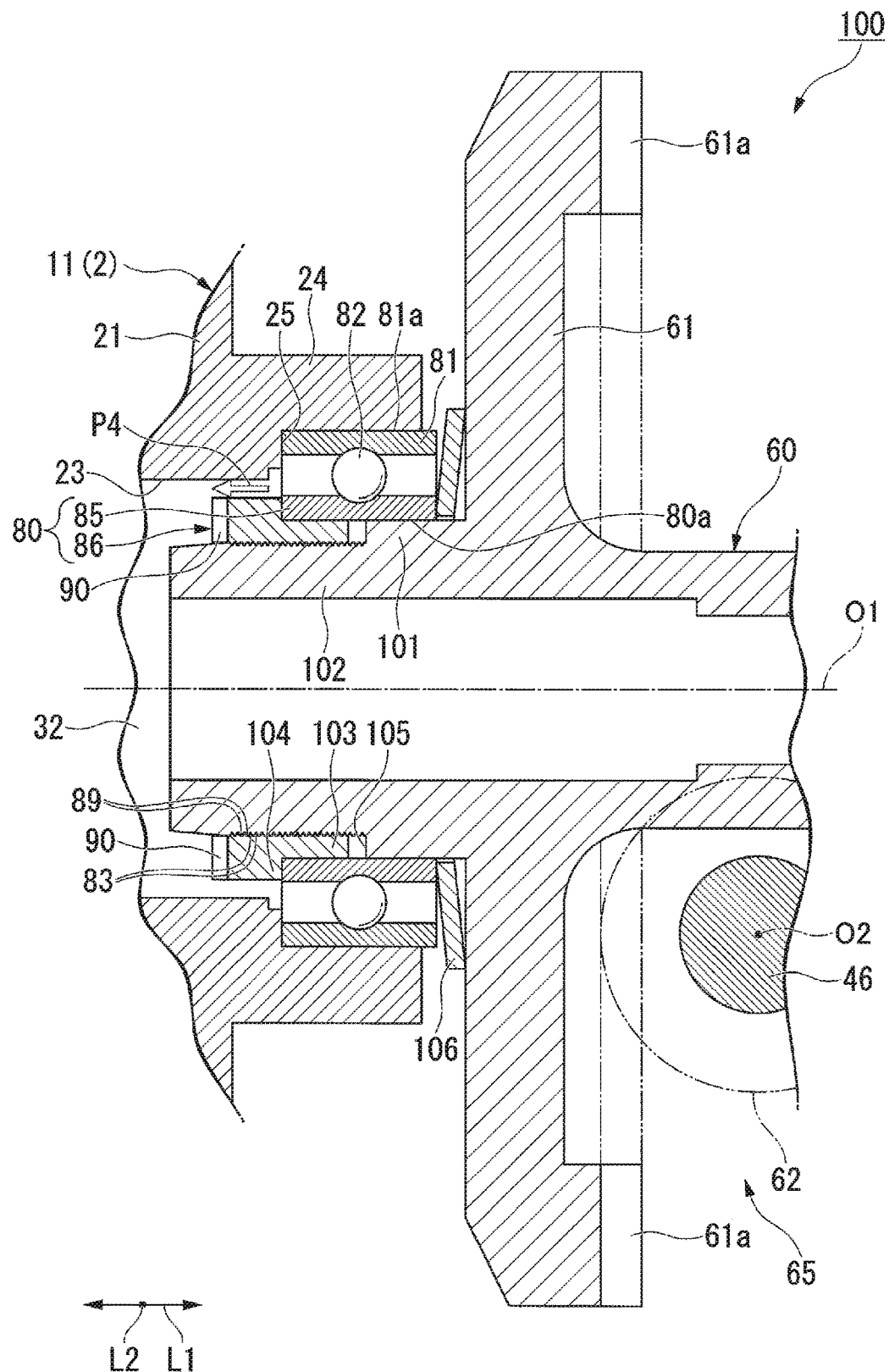
FIG. 10 shows a cross section of the shaft bearing being used to adjust the meshing of the drive gear and the pinion gear after the state shown in FIG. 9.

By rotating the collar 86, as shown by arrow P4 in FIG. 10, it is possible to move (pull out) the collar 86 to the left side. At this time, because the disc spring 106 is biasing the inner race body 85 toward the left side, the inner race body 85 follows the movement of the collar 86 and moves to the left side. That is, by moving the collar 86 to the left side, it is possible to move the inner race body 85, the rolling elements 82 and the outer race 81 to the left side so as to follow the collar 86, by utilizing the elastic restorative force (biasing force) of the disc spring 106.

Accordingly, as shown in FIG. 10, it is possible to bring the outer race 81 of the shaft bearing 63 in contact with (abutting) the abutting surface 25 of the lid part 11 from the right side, and to eliminate the above-described gap (play) that is generated at the time of assembly of the shaft bearing 63, or to control the play to a minimum.

By then rotating the collar 86, it is possible to move the drive shaft 60 relative to the reel body 2 along the first axis O1 direction, while maintaining the position of the shaft bearing 63 relative to the reel body 2.

At this time, the drive shaft 60 moves in the first axis O1 direction, for example, such that the outer circumferential surface thereof comes into sliding contact with the inner bearing surface 80*a* of the inner race body 85. In addition, when the drive shaft 60 moves to the left side along the first axis O1 direction, the compressive deformation of the disc spring 106 progresses slightly, and when the drive shaft 60 moves to the right side along the first axis O1 direction, the compressive deformation is slightly relaxed.

In this manner, even in the present embodiment, by rotating the collar 86, it is possible to move the drive shaft 60 relative to the reel body 2 in the first axis O1 direction, and to cause the drive gear 61 to approach and separate from the pinion gear 62 in the first axis O1 direction. It is thus possible to easily and reliably adjust the meshing between the drive gear 61 and the pinion gear 62.

Assembly of the spinning reel 100 is then possible by attachment of the handle 3 on the second mounting wall 21 side of the lid part 11 of the reel body 2 after adjustment of the meshing between the drive gear 61 and the pinion gear 62.

As described above, even with the spinning reel 100 of the present embodiment, it is possible to easily and reliably adjust the meshing between the drive gear 61 and the pinion gear 62 without degradation of the rotational performance of the drive shaft 60, in the same manner as in the first embodiment.

Furthermore, in the present embodiment, because the inner race body 85, which holds the plurality of rolling elements 82 between itself and the outer race 81, has the inner bearing surface 80*a*, it is possible to rotatably support the drive shaft 60 more stably and precisely. Additionally, since a disc spring 106 is provided, it is possible to prevent the independent operation of the inner race body 85 and the collar 86, even if the inner race body 85 and the collar 86 are arranged side by side in the first axis O1 direction.

Third Embodiment

Next, a third embodiment according to the present invention will be described with reference to the drawings. In the third embodiment, the portions that are the same as compositional elements of the first embodiment have been assigned the same reference symbols, and their descriptions have been omitted.

In the first embodiment, the first threaded portion 83 is formed on the inner race 80 side, but in the present embodiment, the first threaded portion 83 is formed on the outer race 81 side.

Figure 11:
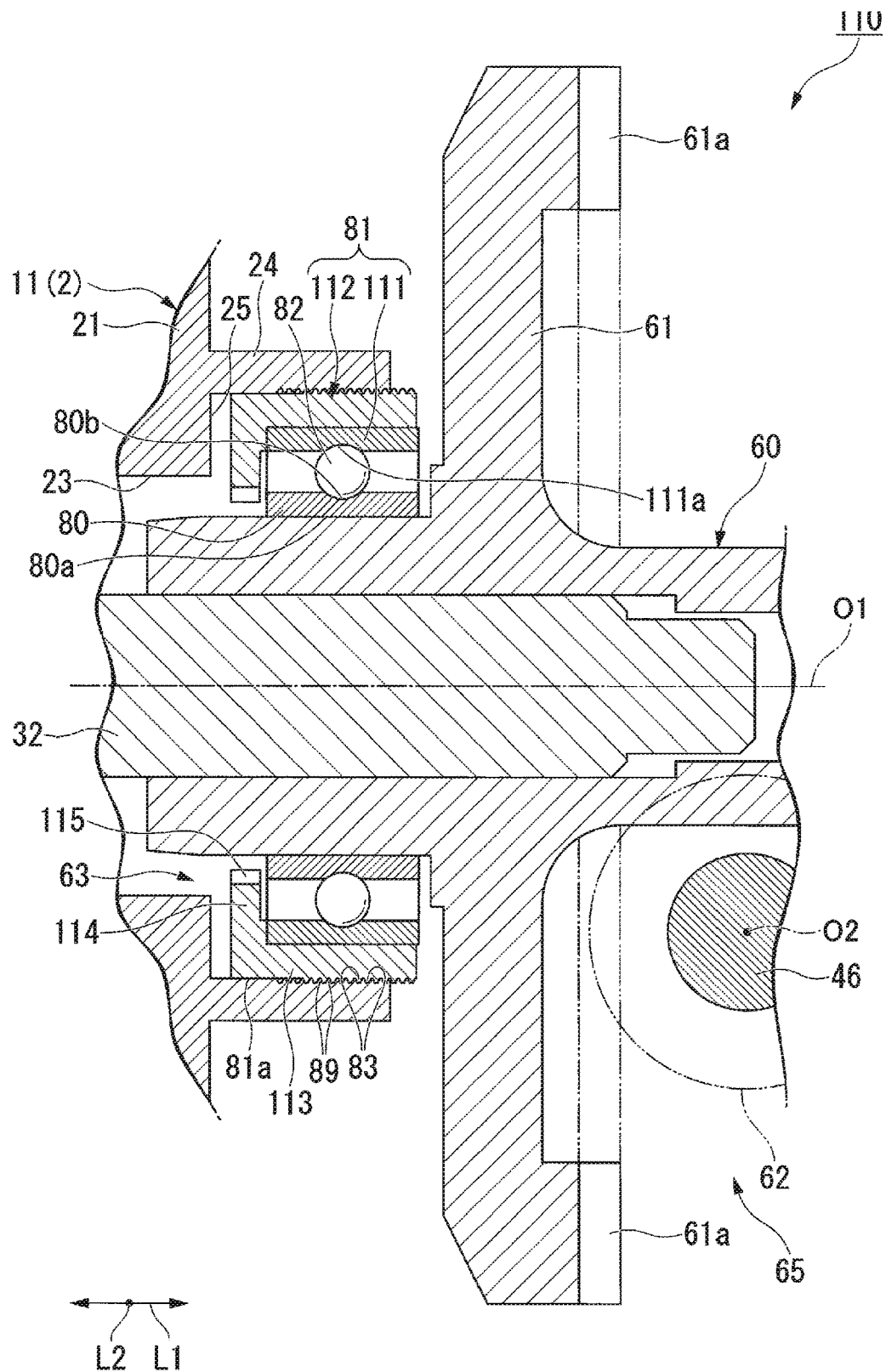
FIG. 11 shows a cross section of a spinning reel according to a third embodiment of the present invention, which is an enlarged cross section of the periphery of the shaft bearing.

As shown in FIG. 11, the shaft bearing 63 of a spinning reel 110 according to the present embodiment includes an outer race 81 comprising an outer race body (first outer race portion) 111 that is disposed on the radially outer side of the inner race 80 and that holds a plurality of rolling elements 82 between itself and the inner race 80, and a collar (second outer race portion) 112 that is disposed between the outer race body 111 and the supporting tube 24 of the lid part 11 of the reel body 2.

The inner race 80 according to the present embodiment is fitted to the outer side of the left-end portion of the drive shaft 60. The inner circumferential surface of the inner race 80 is in contact with the outer circumferential surface of the left-end portion of the drive shaft 60 over the entire surface. The entire inner circumferential surface of the inner race 80 is thus defined as the inner bearing surface 80*a*. An inner annular groove 80*b* is formed on the outer circumferential surface of the inner race 80. A set gap in the first axis O1 direction is ensured between the inner race 80 and the flange portion 68 of the drive shaft 60.

An outer annular groove 111a is formed on the inner circumferential surface of the outer race body 111. A plurality of rolling elements 82 are rollably held between the outer annular groove 111a and the inner annular groove 80b while being held in position in the circumferential direction by a retaining element, not shown.

The collar 112 comprises a cylindrical collar tube 113 that is fitted on the outer side of the outer race body 111 and a flange portion 114 that is formed so as to project radially inward from the left-end portion of the collar tube 113.

The collar tube 113 projects farther to the left side than the outer race body 111. The outer circumferential surface of the portion of the collar tube 113 that is positioned closer to the left-end portion of the collar tube 113 is in sliding contact with the inner circumferential surface of the drive shaft 24. Therefore, the outer circumferential surface of the portion positioned closer to the left-end portion of the collar tube 113 is defined as the outer bearing surface 81a. A first threaded portion 83 (for example, a male threaded portion) that functions as an adjustment portion is formed on the outer circumferential surface of the portion of the collar tube 113 that is positioned on the right side of the outer bearing surface 81a. The first threaded portion 83 is thus formed to be aligned with the outer bearing surface 81a in the first axis O1 direction.

A second threaded portion 89 (for example, a female threaded portion) that screws onto the first threaded portion 83 is formed on a portion of the inner circumferential surface of the supporting tube 24. The second threaded portion 89 functions as an adjustment target portion that moves the drive shaft 60 relative to the reel body 2 in the first axis O1 direction in cooperation with the first threaded portion 83. The first threaded portion 83 and the second threaded portion 89 are screwed together at a predetermined meshing force.

The flange portion 114 is disposed on the left side of the outer race body 111 and is in contact with the outer race body 111 from the left side. A set gap in the first axis O1 direction is ensured between the flange portion 114 and the abutting surface 25 of the reel body 2.

Slit-shaped operation grooves 115 that extend through the flange portion 114 in the left-right direction L1 are formed in the inner peripheral portion of the flange portion 114. In the illustrated example, four operation grooves 115 are formed at equal intervals in the circumferential direction so as to be arranged in the form of a cross. However, the arrangement and number of the operation grooves 115 are not limited in this way and may be designed in any manner desired.

The inner peripheral portion of the flange portion 114 in which the above-described operation grooves 115 are formed is disposed on the radially inner side of the inner circumferential surface of the second mounting hole 23. It is thereby possible to access the flange portion 114 from the outside of the reel body 2 through the second mounting hole 23 by removing the handle 3 from the lid part 11 of the reel body 2. It is thereby possible to insert, for example, a tool inside the second mounting hole 23 from the outside of the reel body 2 and engage the operation grooves 115 with the tool to rotate the collar 112 about the first axis O1.

Adjustment of the Meshing Between the Drive Gear and the Pinion Gear

Described next is a case in which the meshing between the drive gear 61 and the pinion gear 62 is adjusted in the spinning reel 110 according to the present embodiment configured as described above.

For example, when the meshing is adjusted at the time of assembly of the spinning reel 110, the shaft bearing 63 is attached to the inner side of the supporting tube 24 in advance by screwing the first threaded portion 83 onto the second threaded portion 89 of the supporting tube 24. The lid part 11 in which the shaft bearing 63 is attached to the supporting tube 24 is then assembled onto the body portion 10, in which each reel component is assembled in the housing space 13. At this time, the lid part 11 is assembled onto the body portion 10 such that the inner race 80 is fitted to the left-end portion of the drive shaft 60. It is thereby possible to set the shaft bearing 63 between the supporting tube 24 of the lid part 11 and the drive shaft 60.

However, the embodiment is not limited to the embodiment described above; for example, only the collar 112 may be attached to the inner side of the supporting tube 24 in advance by screwing the first threaded portion 83 onto the second threaded portion 89 of the supporting tube 24. In addition, the inner race 80 may be fitted to the left-end portion of the drive shaft 60 to attach the inner race 80, the rolling elements 82, and the outer race body 111 to the drive shaft 60 in advance. Thereafter, the outer race body 111 may be fitted to the inner side of the collar 112 by assembling the lid part 11 onto the body portion 10. In this embodiment as well, it is possible to set the shaft bearing 63 between the supporting tube 24 of the lid part 11 and the drive shaft 60.

Next, the meshing between the drive gear 61 and the pinion gear 62 is adjusted before attaching the handle 3.

Specifically, a tool, not shown, is inserted into the second mounting hole 23 that is formed in the lid part 11 from the outside of the reel body 2, and the tool engages the operation grooves 115 that are formed on the flange portion 114. Then, while the rotation of the drive shaft 60 about the first axis O1 is restricted, the tool is used to rotate the collar 112 with respect to the reel body 2 and the drive shaft 60.

It is thereby possible to move the entire shaft bearing 63 relative to the reel body 2 along the first axis O1 direction, and to correspondingly move the drive shaft 60 along the first axis O1 direction. In the present embodiment, the inner race 80 is fitted so as to be integrally connected to the drive shaft 60, and the shaft bearing 63 and the drive shaft 60 move integrally in the first axis O1 direction.

In this manner, in the present embodiment as well, by rotation of the collar 112, it is possible to move the drive shaft 60 relative to the reel body 2 in the first axis O1 direction, and to cause the drive gear 61 to approach and move away from the pinion gear 62 in the first axis O1 direction. Accordingly, it is possible to easily and reliably adjust the meshing between the drive gear 61 and the pinion gear 62.

It is then possible to assemble the spinning reel 110 by attachment of the handle 3 on the second mounting wall 21 side of the lid part 11 of the reel body 2 after adjustment of the meshing between the drive gear 61 and the pinion gear 62.

As described above, with the spinning reel 110 of the present embodiment as well, it is possible to easily and reliably adjust the meshing between the drive gear 61 and the pinion gear 62 without degradation of the rotational performance of the drive shaft 60, in the same manner as in the first embodiment.

Furthermore, since both the outer bearing surface 81a and the first threaded portion 83 are formed on the collar 112 and the first threaded portion 83 and the outer bearing surface 81a are disposed side by side in the first axis O1 direction, when the meshing between the drive gear 61 and the pinion gear 62 is adjusted, it is possible to suppress axial displacement of the drive shaft 60, and to adjust the meshing without being affected by axial displacement, in the same manner as in the first embodiment.

Furthermore, the outer race 81 is configured from an outer race body 111 that holds a plurality of rolling elements 82 between itself and the inner race 80, and a collar 112 on which a first threaded portion 83 is formed. It is thus possible to rotatably support the drive shaft 60 around the first axis O1 together with the inner race 80 and the rolling elements 82 primarily by utilizing the outer race body 111, and to adjust the meshing between the drive gear 61 and the pinion gear 62 primarily by utilizing the collar 112. It is thus possible to provide a shaft bearing 63 with which the meshing between the drive gear 61 and the pinion gear 62 can be adjusted, and the drive shaft 60 can be rotatably supported in a stable manner.

Fourth Embodiment

Next, a fourth embodiment according to the present invention will be described with reference to the drawings. In this fourth embodiment, the portions that are the same as compositional elements of the third embodiment have been assigned the same reference symbols, and their descriptions have been omitted.

In the third embodiment, both the outer bearing surface 81a and the first threaded portion 83 are formed on the collar 112, but in the present embodiment, the outer bearing surface 81a is formed on the outer race body 111.

Figure 12:
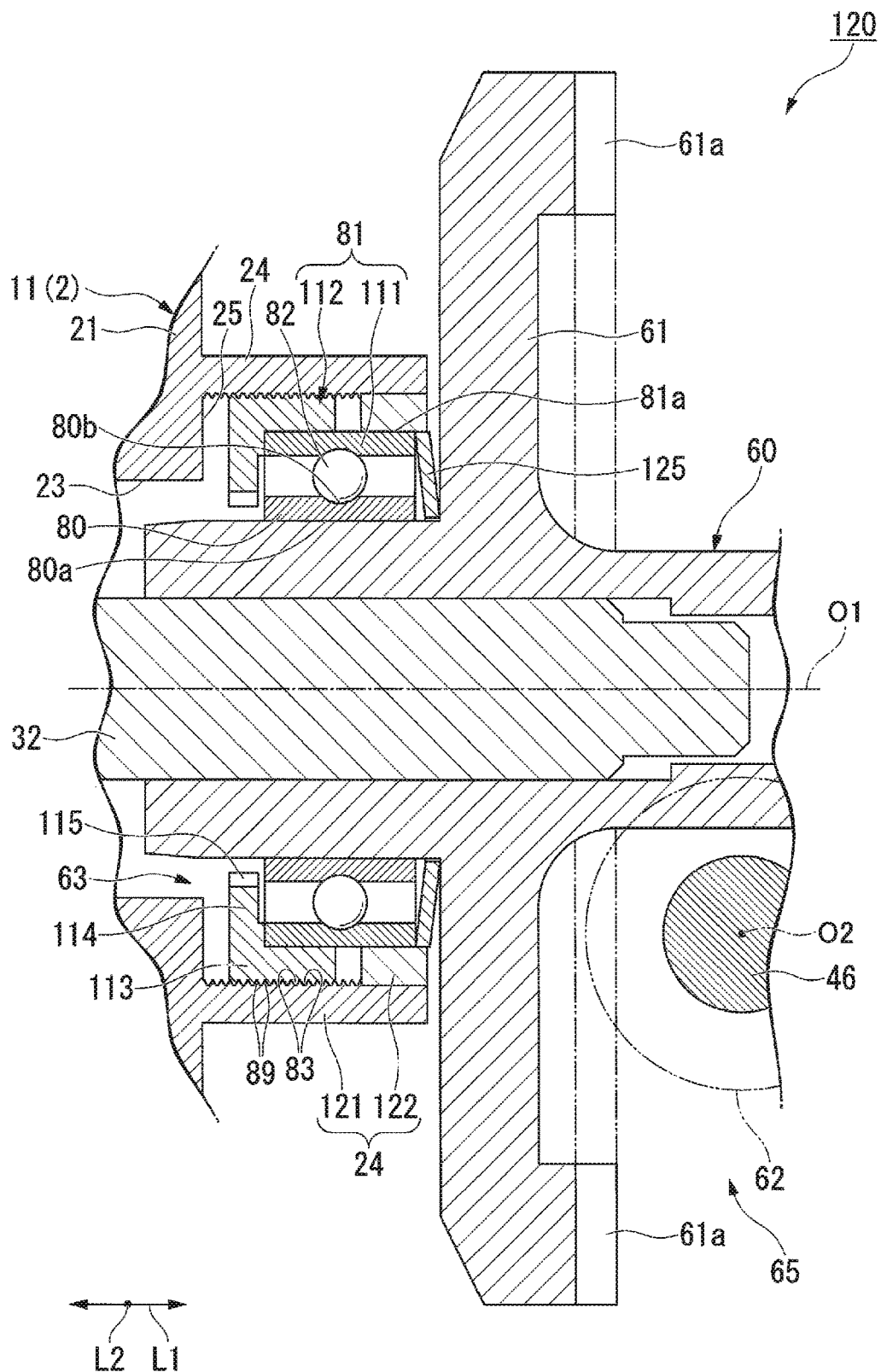
FIG. 12 shows a cross section of a spinning reel according to a fourth embodiment of the present invention, which is an enlarged cross section of the periphery of the shaft bearing.

As shown in FIG. 12, in a spinning reel 120 of the present embodiment, the supporting tube 24 of the lid part 11 of the reel body 2 is formed in a two-stage cylindrical shape, comprising a first supporting cylinder 121 that extends from the second mounting wall 21 to the inner side of the housing space 13, i.e., to the drive gear 61 side, along the first axis O1, and a second supporting cylinder 122 that is disposed on the inner side of a portion of the first supporting cylinder 121 that is positioned on the opening side.

The second supporting cylinder 122 is, for example, detachably fitted to the inner side of the first supporting cylinder 121. That is, the second supporting cylinder 122 is assembled on the first supporting cylinder 121 in a detachable manner. It is thereby possible to remove the second supporting cylinder 122 from the first supporting cylinder 121 to the right side.

A second threaded portion 89 is formed on the inner circumferential surface of a portion of the first supporting cylinder 121 that is positioned farther on the left side than the second supporting cylinder 122. The inner diameter of the portion of the first supporting cylinder 121 on which the second supporting cylinder 122 is fitted is of such size that it is possible to insert the collar 112 into the first supporting cylinder 121 when removing the second supporting cylinder 122.

The outer race body 111 is in contact with the inner circumferential surface of the second supporting cylinder 122 in a state in which a portion thereof projects farther to the left side than the second supporting cylinder 122. The portion of the outer circumferential surface of the outer race body 111 that is in contact with the inner circumferential surface of the second supporting cylinder 122 is thus defined as the outer bearing surface 81a.

The collar tube 113 is fitted to the inner side of a portion of the outer race body 111 that projects farther to the left side than the second supporting cylinder 122. The flange portion 114 is formed so as to project radially inwards from a portion of the collar tube 113 that projects farther to the left side than the inner race body 85.

A first threaded portion 83 that screws onto the second threaded portion 89 is formed over the entire outer circumferential surface of the collar tube 113. A set gap is ensured in the first axis O1 direction between the right end surface of the collar tube 113 and the second supporting cylinder 122.

As described above, in the present embodiment, the outer race body 111 and the collar 112 are arranged side by side in the first axis O1 direction, the outer bearing surface 81a is formed on the outer race body 111, and the first threaded portion 83 is formed on the collar 112. Therefore, in the present embodiment as well, the outer bearing surface 81a and the first threaded portion 83 are arranged side by side in the first axis O1 direction.

Furthermore, a disc spring (outer race biasing member) 125 for pressing the outer race body 111 against the collar 112 is attached between the shaft bearing 63 and the drive gear 61.

The disc spring 125 is formed with an annular shape that surrounds the drive shaft 60 from the outer side of the circumferential direction and is disposed coaxially with the first axis O1 between the outer race body 111 and the drive gear 61. The disc spring 125 is disposed between the outer race body 111 and the drive gear 61 while in a state of compressive deformation in the first axis O1 direction, and the outer peripheral portion thereof is in contact with the outer race body 111 from the right side while the inner peripheral portion thereof is in contact with the drive gear 61 from the left side. As a result, the disc spring 125 constantly biases the outer race body 111 by pressing leftwards by its own elastic restoring force.

Adjustment of the Meshing Between the Drive Gear and the Pinion Gear

Described next is a process in which the meshing between the drive gear 61 and the pinion gear 62 is adjusted in the spinning reel 120 according to the present embodiment configured as described above.

For example, when the meshing is adjusted at the time of assembly of the spinning reel 120, the shaft bearing 63 is attached to the inner side of the first supporting cylinder 121 in advance by screwing the first threaded portion 83 onto the second threaded portion 89 that is formed on the first supporting cylinder 121, which constitutes the supporting tube 24. For attachment of the shaft bearing 63, for example, it is possible to attach the shaft bearing 63 by screwing the collar 112 into the first supporting cylinder 121 from the right side, in a state in which the second supporting cylinder 122 is removed from the first supporting cylinder 121. The second supporting cylinder 122 is then fitted to the inner side of the first supporting cylinder 121 from the right side to join the first supporting cylinder 121 and the second supporting cylinder 122.

Next, the lid part 11, in which the shaft bearing 63 is attached to the supporting tube 24, is assembled onto the body portion 10, in which each reel component is assembled in the housing space 13. At this time, the lid part 11 is assembled onto the body portion 10 such that the inner race 80 is fitted to the left-end portion of the drive shaft 60 after attachment of the disc spring 125 to the left-end portion of the drive shaft 60. It is thereby possible to set the shaft bearing 63 between the supporting tube 24 of the lid part 11 and the drive shaft 60.

The disc spring 125 is gradually sandwiched between the outer race body 111 and the drive gear 61 and subjected to compressive deformation as the lid part 11 is assembled.

Next, the meshing between the drive gear and the pinion gear is adjusted before attachment of the handle 3.

Specifically, a tool, not shown, is inserted into the second mounting hole 23 that is formed in the lid part 11 from the outside of the reel body 2, and the tool engages the operation grooves 115 that are formed on the flange portion 114. Then, while the rotation of the drive shaft 60 about the first axis O1 is restricted, the tool is used to rotate the collar 112 with respect to the reel body 2 and the drive shaft 60.

It is thereby possible to move the entire shaft bearing 63 relative to the reel body 2 along the first axis O1 direction and to correspondingly move the drive shaft 60 along the first axis O1 direction. In particular, because the outer race body 111 is biased to the left side by the disc spring 125 and presses against the collar 112, it is possible cause the outer race body 111 to reliably follow the movement of the collar 112.

In the present embodiment, the inner race 80 is fitted so as to be integrally connected to the drive shaft 60, and the shaft bearing 63 and the drive shaft 60 move integrally in the first axis O1 direction. Furthermore, the shaft bearing 63 moves in the first axis O1 direction such that the outer bearing surface 81a slides against the inner circumferential surface of the second supporting cylinder 122.

In this manner, in the present embodiment as well, by rotating the collar 112, it is possible to move the drive shaft 60 relative to the reel body 2 in the first axis O1 direction, and to cause the drive gear 61 to approach and move away from/the pinion gear 62 in the first axis O1 direction. It is thus possible to easily and reliably adjust the meshing between the drive gear 61 and the pinion gear 62.

It is then possible to assemble the spinning reel 120 by attachment of the handle 3 on the second mounting wall 21 side of the lid part 11 of the reel body 2 after adjustment of the meshing between the drive gear 61 and the pinion gear 62.

As described above, even with the spinning reel 120 of the present embodiment, it is possible to easily and reliably adjust the meshing between the drive gear 61 and the pinion gear 62 without degradation of rotational performance of the drive shaft 60, in the same manner as in the third embodiment.

Furthermore, in the present embodiment, because the outer race body 111, which holds the plurality of rolling elements 82 between itself and the inner race 80, has the outer bearing surface 81a, it is possible to rotatably support the drive shaft 60 more stably and accurately.

While embodiments of the present invention have been described, these embodiments have been presented only as examples and are not intended to limit the scope of the invention. The embodiments may be implemented in a variety of other forms; furthermore, various omissions, substitutions and changes may be made without departing from the essence of the invention. Embodiments and modifications thereof include those that can be easily conceived of by a person skilled in the art, those that are substantially the same, and those that are of equivalent scope.

For example, in each of the embodiments described above, an example was described in which a first threaded portion 83 that is formed on an inner race 80 or an outer race 81 of the shaft bearing 63 is screwed onto a second threaded portion 89 that is formed on the drive shaft 60, and the first threaded portion 83 is used as the adjustment portion, but no limitation is thereby imposed.

For example, it is possible to employ a sliding friction type of adjustment portion that moves the drive shaft 60 relative to the reel body 2 in the first axis O1 direction by utilizing frictional resistance, when the shaft bearing 63 is slid in the first axis O1 direction relative to the drive shaft 60 and the reel body 2.

Furthermore, a configuration may be employed, in which, for example, a plurality of engagement recesses (adjusted portions) are formed on the drive shaft 60 at intervals in the first axis O1 direction, and the drive shaft 60 is adjusted relative to the reel body 2 in the first axis O1 direction in a stepwise manner (so-called step adjustment), by detachably engaging the adjustment portion with the engagement recesses by means of elastic deformation, when the shaft bearing 63 is slid in the first axis O1 direction relative to the drive shaft 60 and the reel body 2.

In any case, the adjustment portion may be configured in any manner as long as it is possible to move the drive shaft 60 relative to the reel body 2 in the first axis O1 direction when the shaft bearing 63 is moved relative to the drive shaft 60 and the reel body 2 (for example, rotated or slid). In addition, it is sufficient if the adjustment portion is formed in at least one of the inner circumferential surface of the inner race 80 or the outer circumferential surface of the outer race 81.

Moreover, in the second embodiment and the fourth embodiment, disc springs 106, 125 were described as examples of the inner race biasing member and the outer race biasing member, but the present invention is not limited to a disc spring. For example, a plate spring, a coil spring, or an elastic body such as rubber may be used as well.

What is claimed is:

1. A fishing reel, comprising:
   a reel body having a handle;
   a drive shaft supported by the reel body so as to be rotatable about a first axis and connected to the handle;
   a drive gear disposed on the drive shaft;
   a pinion gear meshing with the drive gear and rotating about a second axis, which is transverse to the first axis, when the drive shaft rotates; and
   a shaft bearing between the drive shaft and the reel body and supporting the drive shaft so as to rotate about the first axis;
   the shaft bearing comprising
      an inner race having an inner bearing surface in contact with the drive shaft, the inner bearing surface disposed on at least part of an inner circumferential surface of the inner race, and
      an outer race having an outer bearing surface in contact with the reel body, the outer bearing surface disposed on at least part of an outer circumferential surface of the outer race,
   an adjustment portion disposed on at least one of the inner circumferential surface and the outer circumferential surface, and configured to move the drive shaft relative to the reel body in a first axial direction when the shaft bearing is moved relative to the drive shaft and the reel body.

2. The fishing reel according to claim 1, wherein the adjustment portion is side by side with at least one of the inner bearing surface or the outer bearing surface in the first axial direction.

3. The fishing reel according to claim 1, wherein at least one of the drive shaft or the reel body includes an adjustment target portion configured to move the drive shaft relative to the reel body in the first axial direction in cooperation with the adjustment portion.

4. The fishing reel according to claim 3, wherein the adjustment portion comprises a first threaded portion, the adjustment target portion comprises a second threaded portion configured to screw onto the first threaded portion, and the adjustment portion is configured to move the drive shaft relative to the reel body in the first axial direction when the shaft bearing is rotated about the first axis relative to the drive shaft and the reel body.

5. The fishing reel according to claim 1, wherein the inner race comprises a first inner race portion holding rolling elements between the outer race and the first inner race portion, and second inner race portion comprises the adjustment portion.

6. The fishing reel according to claim 5, wherein the first inner race portion comprises the inner bearing surface.

7. The fishing reel according to claim 5, wherein the second inner race portion comprises the inner bearing surface.

8. The fishing reel according to claim 5, wherein the shaft bearing comprises an inner race biasing member pressing the first inner race portion or the second inner race portion against the other of the first inner portion and the second inner race portion.

9. The fishing reel according to claim 1, wherein the outer race comprises a first outer race portion holding rolling elements between the inner race and the first outer race portion, and a second outer race portion comprises the adjustment portion.

10. The fishing reel according to claim 9, wherein the first outer race portion comprises the outer bearing surface.

11. The fishing reel according to claim 9, wherein the second outer race portion comprises the outer bearing surface.

12. The fishing reel according to claim 9, wherein the shaft bearing comprises an outer race biasing member pressing the first outer race portion or the second outer race portion against the other of the first outer race portion and the second outer race portion.

* * * * *